(12) United States Patent
Jones et al.

(10) Patent No.: US 11,958,133 B1
(45) Date of Patent: Apr. 16, 2024

(54) METHODS TO SHAPE A CEMENTED CARBIDE SUBSTRATE USING A LASER

(71) Applicant: US SYNTHETIC CORPORATION, Orem, UT (US)

(72) Inventors: Paul Douglas Jones, Elk Ridge, UT (US); Benjamin Michael Spencer, Spanish Fork, UT (US); Brent Richard Eddy, Vineyard, UT (US); Mark Pehrson Chapman, Provo, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 1144 days.

(21) Appl. No.: 16/731,750

(22) Filed: Dec. 31, 2019

Related U.S. Application Data

(60) Provisional application No. 62/788,249, filed on Jan. 4, 2019.

(51) Int. Cl.
| | |
|---|---|
| *B23K 26/352* | (2014.01) |
| *B23K 103/08* | (2006.01) |
| *C22C 29/08* | (2006.01) |
| *E21B 10/46* | (2006.01) |

(52) U.S. Cl.
CPC .......... *B23K 26/3576* (2018.08); *C22C 29/08* (2013.01); *E21B 10/46* (2013.01); *B23K 2103/08* (2018.08)

(58) Field of Classification Search
CPC .. B23K 6/3576; B23K 2103/08; C22C 29/08; E21B 10/46
USPC ................ 219/121.69; 51/297, 309; 175/430
See application file for complete search history.

(56) References Cited

U.S. PATENT DOCUMENTS

| | | | |
|---|---|---|---|
| 6,338,754 B1 | 1/2002 | Cannon et al. | |
| 8,236,074 B1 | 8/2012 | Bertagnolli et al. | |
| 8,995,752 B2 | 3/2015 | Kim et al. | |
| 9,346,149 B1 | 5/2016 | Linford et al. | |
| 9,931,714 B2 * | 4/2018 | DiGiovanni | B23K 26/0643 |
| 9,999,962 B2 | 6/2018 | Chapman et al. | |
| 2012/0159865 A1 * | 6/2012 | Liversage | B24D 18/00 51/297 |
| 2014/0367177 A1 * | 12/2014 | Gonzalez | E21B 10/5676 51/307 |

OTHER PUBLICATIONS

U.S. Appl. No. 14/627,966, filed Feb. 20, 2015.
U.S. Appl. No. 16/084,469, filed Sep. 12, 2018.
U.S. Appl. No. 29/626,328, filed Nov. 16, 2017.
U.S. Appl. No. 62/788,249, filed Jan. 4, 2019.

(Continued)

*Primary Examiner* — Tu B Hoang
*Assistant Examiner* — Thomas J Ward
(74) *Attorney, Agent, or Firm* — Dorsey & Whitney LLP

(57) ABSTRACT

In one or more embodiments, a method includes selecting a cemented carbide substrate from a plurality of cemented carbide substrates in a substrate inventory. Each of the plurality of cemented carbide substrates have a substantially planar top surface. The method also includes emitting a plurality of laser pulses from a laser towards at least the substantially planar top surface of the cemented carbide substrate to ablate selected regions of the cemented carbide substrate thereby forming the cemented carbide substrate into a selected shape.

21 Claims, 14 Drawing Sheets

(56) References Cited

OTHER PUBLICATIONS

Decker, D.L. et al., "High-Pressure Calibration: A Critical Review", J. Phys. Chem. Ref. Data, vol. 1, No. 3, 1972, pp. 1, 3.
Rousse, G. et al., "Structure of the intermediate phase of PbTe at high pressue", Physical Review B, Condensed Matter and Materials Physics, 71, 2005, 224116-1-224116-6.

\* cited by examiner

METHODS TO SHAPE A CEMENTED CARBIDE SUBSTRATE USING A LASER

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer/volume commonly known as a diamond table. The diamond table is formed and bonded to a substrate using a high-pressure/high-temperature ("HPHT") process that sinters diamond particles under diamond-stable conditions. The PDC cutting element may also be brazed directly into a preformed pocket, socket, or other receptacle formed in a bit body. The substrate may optionally be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container with a volume of diamond particles positioned on a surface of the cemented carbide substrate. A number of such containers may be loaded into an HPHT press. The substrate(s) and volume of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In a conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT sintering process. The cobalt acts as a catalyst to promote intergrowth between the diamond particles, which results in formation of a matrix of bonded diamond grains having diamond-to-diamond bonding there between, with interstitial regions between the bonded diamond grains being occupied by the solvent catalyst.

It is often desirable to machine the PCD table, such for forming a chamfer in the PCD table or for cutting the PDC to provide a desired shape. Such cutting has typically been accomplished by electrical-discharge machining, laser machining, grinding, lapping, or combinations thereof to remove desired portions of the PCD table and substrate.

Despite the availability of such manufacturing methods, manufacturers and users of PDCs continue to seek improved PDC manufacturing methods.

SUMMARY

Embodiments disclosed herein are directed to methods and systems for shaping cemented carbide substrates using a laser. In an embodiment, a method is disclosed. The method includes selecting a cemented carbide substrate from a plurality of cemented carbide substrates in a substrate inventory. Each of the plurality of cemented carbide substrates have a substantially planar surface. The method also includes emitting a plurality of laser pulses from a laser to ablate selected regions of the cemented carbide substrate, thereby forming a selected non-planar surface.

In an embodiment, a method is disclosed. The method includes laser ablating selected regions of a cemented carbide substrate, thereby forming the cemented carbide substrate into a selected shape. Additionally, the method includes enclosing a plurality of diamond particles and the cemented carbide substrate in a pressure transmitting medium to form a cell assembly. The method further includes subjecting the cell assembly to a temperature of at least about 1000° C. and a pressure in the pressure transmitting medium of at least about 4 GPa to infiltrate the plurality of diamond particles with a portion of the metal-solvent catalyst and catalyze formation of a polycrystalline diamond table that is bonded to the cemented carbide substrate.

In an embodiment, a method is disclosed. The method includes uploading instructions into a controller that is operably coupled to the laser. The instructions include a selected shape of a cobalt-cemented tungsten carbide substrate. Additionally, the method includes, after uploading instructions into the controller, laser ablating selected regions of the cobalt-cemented tungsten carbide substrate, thereby forming the cobalt-cemented tungsten carbide substrate into the selected shape. The method further includes enclosing a plurality of diamond particles and the cobalt-cemented tungsten carbide substrate in a pressure transmitting medium to form a cell assembly. The method also includes subjecting the cell assembly to a temperature of at least about 1000° C. and a pressure in the pressure transmitting medium of at least about 4 GPa to infiltrate the plurality of diamond particles with a portion of the metal-solvent catalyst and catalyze formation of a polycrystalline diamond table that is bonded to the cobalt-cemented tungsten carbide substrate.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Figure 1:
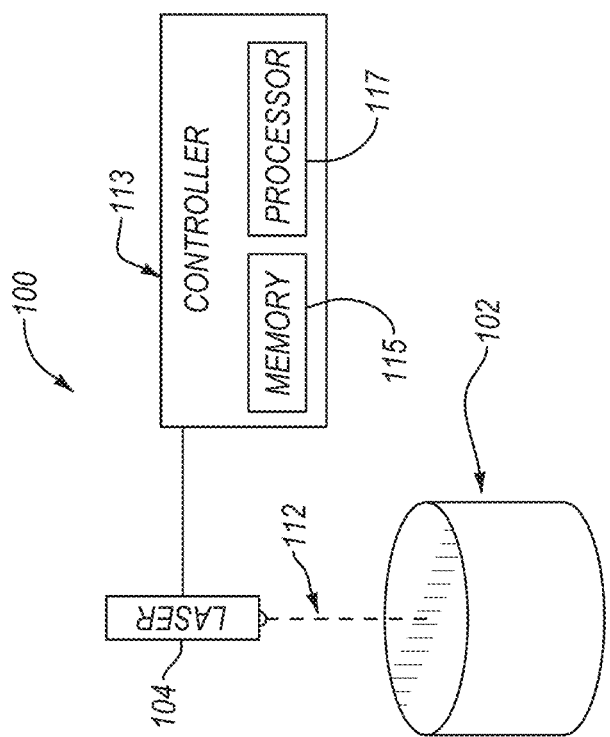
FIG. 1 is a schematic isometric view of a method to shape a cemented carbide substrate using a laser, according to an embodiment.
Figure 1:
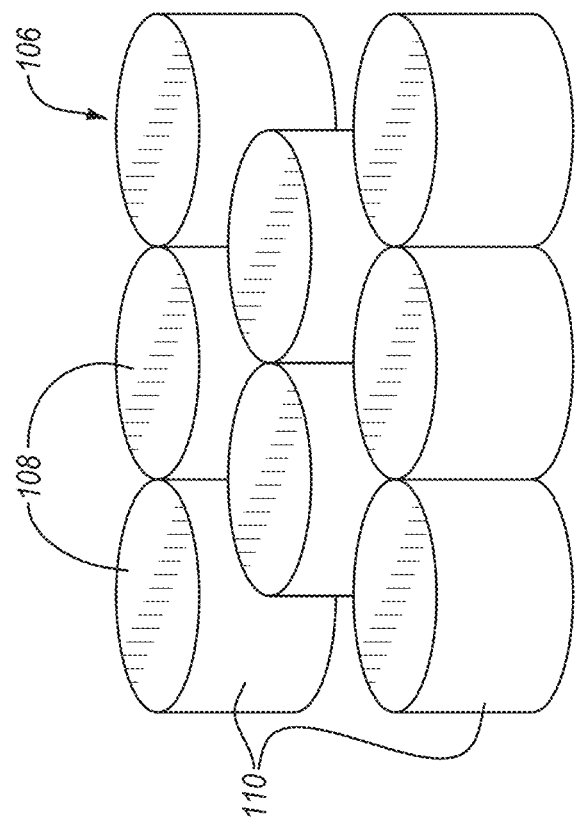

Embodiments disclosed herein are directed to methods and systems for shaping cemented carbide substrates using a laser. In an embodiment, a method includes providing a cemented carbide substrate. Providing the cemented carbide substrate may include selecting the cemented carbide substrate from a plurality of cemented carbide substrates in a substrate inventory. Each of the plurality of cemented carbide substrates may initially have at least one of a substantially planar top surface (e.g., a substantially planar interfacial surface) or a substantially planar bottom surface. The method further includes emitting a plurality of laser pulses from a laser towards the cemented carbide substrate, such as towards the at least the substantially planar top surface or the substantially planar bottom surface of the cemented carbide substrate, to ablate selected regions of the selected cemented carbide substrate. Removing the selected regions of the cemented carbide substrate forms the cemented carbide substrate into a selected shape. For example, the selected shape of the cemented carbide substrate may include a non-planar top surface (e.g., non-planar interfacial surface) or a non-planar bottom surface.

Cemented carbide substrates are used in a variety of devices and application. For example, the cemented carbide substrates may be used to form cutting elements, bearing elements, or may be combined with a superhard material (e.g., PCD) to form a superhard compact. Depending on the application, the cemented carbide substrates may exhibit a variety shapes (e.g., cross-sectional shapes), different sizes (e.g., one or more dimensions of the cemented carbide substrate may vary), different compositions, different top surface topographies, or different bottom surface topographies depending on the application of the cemented carbide substrates.

Conventionally formed substrates with many different geometries may cause inventories of such substrates to be undesirably large. In an embodiment, a method to reduce the inventory for a variety of cemented carbide substrates includes forming a substrate inventory that only includes some of the different types of cemented carbide substrates. For example, a substrate inventory may only include the commonly used types of cemented carbide substrates. However, such a method may result in long delays when a cemented carbide substrate is required that is not present in the substrate inventory ("new cemented carbide substrate"). The long delays may have a significant impact on research of new types of cemented carbide substrates by delaying the manufacture of cemented carbide prototype(s).

In an example, forming the new cemented carbide substrate may include conventionally pressing the new cemented carbide substrate. However, pressing the new cemented carbide substrate requires a mold exhibiting the specific shape of the new cemented carbide substrate. Forming the mold may be a time consuming process thereby delaying the formation of the new cemented carbide substrate. Further, forming the mold may be a cost prohibitive process and may require space for storing the mold. These problems may discourage research into new types of cemented carbide substrates and the manufacture of small batches of the new cemented carbide substrate due to the large cost associated with forming the mold that may never be recouped and the possible need to store a mold that may not be used again.

Alternatively, one method of reducing substrate inventories includes forming the new cemented carbide substrate using machining techniques (e.g., grinding, lapping, or electrical discharge machining). However, the machining techniques may form cracks in the new cemented carbide substrate that may cause premature failure of the new cemented carbide substrate. As such, machining the new cemented carbide substrate that is a prototype may be impractical since the cracks may prevent accurate testing of the prototype. Further, the machining techniques may form a recast layer on the new cemented carbide substrate by melting portions of the new cemented carbide substrate. The recast layer may be depleted of the carbide material (e.g., include excessive amounts of a cement material) and may exhibit inferior wear resistance than other portions of the cemented carbide substrate. Additionally, the shape of the new cemented carbide substrate may be limited by the machining techniques.

In an embodiment, an alternative method to pressing or using machining techniques to form the new cemented carbide substrate includes creating a substrate inventory that includes every possible type of cemented carbide substrate. However, such substrate inventories may be extremely large and require significant resources to maintain. Further, such substrate inventories may still not include new types of cemented carbide substrates. As such, even large substrate inventories may have the same problems as smaller substrate inventories, namely that new cemented carbide substrates may need to be formed via pressing or machining techniques.

However, embodiments disclosed herein may decrease the size of substrate inventories and decrease the need to form the new cemented carbide substrates via pressing or machining techniques. For example, as previously discussed, the methods disclosed herein include selecting a cemented carbide substrate from a plurality of cemented carbide substrates that are already present in the substrate inventory. The methods then include using laser pulses to ablate selected regions of the cemented carbide thereby shaping the cemented carbide substrate into a selected shape. The method for shaping the cemented carbide substrate may be less than 5 minutes, such as about 2 minutes to about 4 minutes or less than 3 minutes. Such methods may avoid the problems disclosed above regarding substrate inventories because these methods may require small substrate inventories instead of large substrate inventories. These methods may also result in avoiding complete depletion of the inventory of custom carbide geometries, may not cause the delays associated with forming new molds, and/or may prevent the formation of cracks and recast layers.

FIG. 1 is a schematic isometric view of a method 100 to shape a cemented carbide substrate 102 using a laser 104, according to an embodiment. The method 100 may include selecting the cemented carbide substrate 102 from a plurality of cemented carbide substrates 106. For example, the method 100 may include selecting the cemented carbide substrate 102 from a substrate inventory that includes the plurality of cemented carbide substrates 106.

The plurality of cemented carbide substrates 106 may include any suitable cemented carbide substrate, without limitation. For example, the plurality of cemented carbide substrates 106 may include tungsten carbide, titanium carbide, chromium carbide, niobium carbide, tantalum carbide, vanadium carbide, or combinations thereof. The carbide grains of the plurality of cemented carbide substrates 106 may be cemented with iron, nickel, cobalt, alloys thereof, or combinations thereof. In an embodiment, each of the plurality of cemented carbide substrates 106 may include cobalt-cemented tungsten carbide.

The plurality of cemented carbide substrates 106 may include a top surface 108 (e.g., an interfacial surface), an opposing bottom surface (not shown, obscured), and at least one lateral surface 110 extending between the top surface 108 and the bottom surface. In an embodiment, as illustrated, each of the plurality of cemented carbide substrates 106 exhibits a generally cylindrical shape. In such an embodiment, each of the plurality of cemented carbide substrates 106 includes a generally circular top surface 108, a generally circular bottom surface, and a single lateral surface 110 defining a generally cylindrical shape. However, in an embodiment, at least one (e.g., all) of the plurality of cemented carbide substrates 106 may exhibit a non-cylindrical shape. For example, at least one of the plurality of cemented carbide substrates 106 may exhibit a generally truncated pie shape, a generally rectangular shape, a generally oblong shape, a generally triangular shape, any other suitable shape. For example, the plurality of cemented carbide substrates 106 can include two or more differently shaped cemented carbide substrates. The shape of the plurality of cemented carbide substrates 106 may depend on a number of factors. In an embodiment, the shape of the plurality of cemented carbide substrates 106 may depend on the shape of the cemented carbide substrates that are present in the substrate inventory.

In an embodiment, as illustrated, the top surface 108 of at least one (e.g., all) of the plurality of cemented carbide substrates 106 may be substantially planar. For example, a substantially planar surface may be a surface that is planar except for manufacturing defects, surface roughness features formed by an unpolished or roughly polished surface, or other insignificant surface variations. In an embodiment, the top surface 108 of at least one (e.g., all) of the plurality of cemented carbide substrates 106 is non-planar. For example, the top surface 108 of at least one of the plurality of cemented carbide substrate 106 may exhibit any of the top surface topographies disclosed herein or any other suitable topography, without limitation. The topographies of the plurality of cemented carbide substrates 106 may depend on the shape of the cemented carbide substrates that are present in the substrate inventory. In an embodiment, the bottom surface of at least one of the plurality of cemented carbide substrates 106 may be substantially planar or non-planar.

In an embodiment, as illustrated, each of the plurality of cemented carbide substrates 106 exhibit substantially the same composition, size, shape, and top surface topography. In another embodiment, at least one cemented carbide substrate of the plurality of cemented carbide substrates 106 may exhibit at least one of a composition, size (e.g., at least one of a thickness, width, or length), shape, or surface (e.g., top or bottom surface) topography that is different than at least one other cemented carbide substrate of the plurality of cemented carbide substrates 106.

Each of the plurality of cemented carbide substrates 106 may exhibit at least one of a size, shape, or top surface topography that is different than a desired cemented carbide substrate. In an embodiment, selecting the cemented carbide substrate 102 from the plurality of cemented carbide substrates 106 includes selecting the cemented carbide substrate 102 to include one or two of the size, shape, or top surface topography of the desired cemented carbide substrate. Such selection of the cemented carbide substrate 102 may reduce the amount shaping required which, in turn, may make the method 100 quicker, more efficient, and/or cheaper than conventional methods.

After selecting the cemented carbide substrate 102, as illustrated, the method 100 includes laser shaping (e.g., emitting a plurality of laser pulses 112 from a laser 104) at least the top surface 108 of the cemented carbide substrate 102 to ablate selected regions of the cemented carbide substrate 102 thereby forming the cemented carbide substrate 102 into a selected shape. As will be discussed in more detail with regards to FIGS. 5A and 5B, the method 100 may include laser shaping the opposing bottom surface of the cemented carbide substrate 102 (instead of or in conjunction with laser shaping the top surface 108) to ablate selected regions of the cemented carbide substrate. It is also noted that the method 100 may include laser shaping the lateral surface of the cemented carbide substrate (instead of or in conjunction with laser shaping the top surface 108 and/or the bottom surface) to ablate selected regions of the cemented carbide substrate 102.

In an embodiment, the method 100 may include removing the selected cemented carbide substrate 102 from the plurality of cemented carbide substrates 106 and positioning the cemented carbide substrate 102 proximate to the laser 104. For example, the method 100 may include at least one of moving the cemented carbide substrate 102 relative to the laser 104, moving the laser 104 relative to the cemented carbide substrate 102, or directing (e.g., via a galvo mirror) the plurality of laser pulses 112 to ablate selected volumes or regions of cemented carbide substrate 102.

The laser 104 may include any suitable laser, without limitation. For example, the laser 104 may include a pulse laser, a carbon dioxide laser, an yttrium aluminum garnet laser, a diode laser, a CNC laser, or any other suitable laser. In an embodiment, the laser 104 includes one or more lenses and/or mirror that move such that the laser pulses 112 controllably ablate different portions of the cemented carbide substrate 102. In an embodiment, the laser 104 include a stage the controllably moves such that the laser pulses 112 controllably ablate a selected portion of the cemented carbide substrate 102.

The laser 104 may emit the laser pulses 112 exhibiting characteristics that are configured to effectively ablate portions of the cemented carbide substrate 102. In an embodiment, the laser 104 may emit the laser pulses 112 at an average power of about 0.25 watt to about 1000 watts, such as at ranges of about 1 watts to about 500 watts, about 0.25 watts to about 5 watts, about 1 watt to about 20 watts, about 10 watts to about 30 watts, about 20 watts to about 40 watts, about 30 watts to about 50 watts, about 40 watts to about 60 watts, about 50 watts to about 75 watts, about 70 watts to about 100 watts, about 75 watts to about 150 watts, about 100 watts to about 200 watts, about 150 watts to about 300 watts, about 200 watts to about 400 watts, about 300 watts to about 500 watts, about 400 watts to about 600 watts, about 500 watts to about 750 watts, about 600 watts to about 900 watts, or about 700 watts to about 1000 watts. In an embodiment, the laser 104 may emit the laser pulses 112 at an average power per pulse of about 1 microjoules ("µJ") to about 100 millijoules ("mJ"), such as at ranges of about 1 µJ to about 100 µJ, about 50 µJ to about 250 µJ, about 100 µJ to about 500 µJ, about 250 µJ to about 750 µJ, about 500 µJ to about 1 mJ, about 750 µJ to about 1.5 mJ, about 1 mJ to about 2 mJ, about 1.5 mJ to about 3 mJ, about 2 mJ to about 4 mJ, about 3 mJ to about 5 mJ, about 4 mJ to about 10 mJ, about 7 mJ to about 15 mJ, about 10 mJ to about 20 mJ, about 15 mJ to about 30 mJ, about 25 mJ to about 50 mJ, about 40 mJ to about 80 mJ, or about 60 mJ to about 100 mJ. In an embodiment, the laser 104 may emit the laser pulses 112 at a frequency of about 1 kHz to about 100 MHz, such as at ranges of about 1 kHz to about 30 kHz, about 20 kHz to about 100 kHz, about 50 kHz to about 200 kHz, about 100 kHz to about 300 kHz, about 200 kHz to about 400 kHz, about 300 kHz to about 500 kHz, about 400 kHz to about 600 kHz, about 500 kHz to about 750 kHz, about 600 kHz, to about 900 kHz, about 700 kHz to about 1 MHz, about 900 kHz to about 1.3 MHz, about 1 MHz to about 1.5 MHz, about 1.3 MHz to about 1.7 MHz, about 1.5 MHz to about 2 MHz, about 1.7 MHz to about 2.5 MHz, about 2 MHz to about 3 MHz, about 2.5 MHz to about 5 MHz, about 4 MHz to about 8 MHz, about 7 MHz to about 15 MHz, about MHz to about 20 MHz, about 15 MHz to about 30 MHz, about 25 MHz to about 40 MHz, about 35 MHz to about 60 MHz, about 50 MHz to about 75 MHz, or about 70 MHz to about 100 MHz. In an embodiment, the laser 104 may emit the laser pulses 112 at wavelength of about 400 nm to about 14 µm, such as at ranges of about 400 nm to about 600 nm, about 500 nm to about 700 nm, about 600 nm to about 800 nm, about 750 nm to about 1 µm, about 800 nm to about 1.3 µm, about 1 µm to about 1.5 µm, about 1.3 µm to about 1.7 µm, about 1.5 µm to about 2 µm, about 1.7 µm to about 3 µm, about 2 µm to about 4 µm, about 3 µm to about 5 µm, about 4 µm to about 6 µm, about 5 µm to about 8 µm, about 7 µm to about 10 µm, about 8 µm to about 11 µm, about 10 µm to about 12.5 µm, or about 12 µm to about 14 µm. In an embodiment, the laser 104 may emit the laser pulses 112 at pulse duration of about 1 femtosecond ("fs") to about 1 millisecond, such as at ranges of about 1 fs to about 100 fs, about 50 fs to about 500 fs, about 100 fs to about 1 picosecond ("ps"), about 500 fs to about 5 ps, about 1 ps to about 10 ps, about 5 ps to about 50 ps, about 10 ps to about 100 ps, about 50 ps to about 500 ps, about 100 ps to about 1 nanosecond ("ns"), about 500 ps to about 5 ns, about 1 ns to about 10 ns, about 5 ns to about ns, about 10 ns to about 100 ns, about 50 ns to about 500 ns, about 100 ns to about 1 microsecond ("µs"), about 500 nm to about 5 µs, about 1 µs to about 10 µs, about 5 µs to about 50 µs, about 10 µs to about 100 µs, about 50 µs to about 500 µs, or about 100 µs to about 1 millisecond. In an embodiment, the laser 104 may emit the laser pulses 112 at beam diameter of about 5 µm to about 6 mm, such as at ranges of about 5 µm to about 30 µm, about 10 µm to about 50 µm, about 25 µm to about 75 µm, about 50 µm to about 100 µm, about 75 µm to about 150 µm, about 100 µm to about 200 µm, about 150 µm to about 300 µm, about 200 µm to about 400 µm, about 300 µm to about 500 µm, about 400 µm to about 700 µm, about 600 µm to about 1 mm, about 800 mm to about 1.2 mm, about 1 mm to about 1.5 mm, about 1.2 mm to about 1.7 mm, about 1.5 mm to about 3 mm, about 2 mm to about 4 mm, or about 3 mm to about 6 mm. In an embodiment, the laser 104 may emit the laser pulses 112 at beam divergence of about 0 milliradians ("mr") to about 1 mr, such as in ranges of about 0 mr to about 0.1 mr, about 0.05 mr to about 0.2 mr, about 0.1 mr to about 0.3 mr, about 0.2 mr to about 0.4 mr, about 0.3 mr to about 0.5 mr, about 0.4 mr to about 0.7 mr, or about 0.6 mr to about 1 mr. In an embodiment, the average power, average power per pulse, frequency, wavelength, pulse duration, beam diameter, or beam divergence of the laser pulses 112 may be less than or greater than any of the above values.

The laser 104 and the laser pulses 112 may be controlled in a manner that allows the laser pulses 112 to ablate selected regions of the cemented carbide substrate 102 with high precision. For example, the laser 104 and the laser pulses 112 may be configured to ablate selected regions of the cemented carbide substrate 102 such that at least the top surface 108 of the cemented carbide substrate 102 is substantially free of ridges or exhibits a selected surface finish. Ablating the cemented carbide substrate 102 with high precision may facilitate bonding of the cemented carbide substrate 102 to a superhard material and avoid the formation of stress concentrators that may cause premature failure of the cemented carbide substrate 102. U.S. patent application Ser. No. 16/084,469 filed on Sep. 12, 2018 discloses several methods of controllably shaping a material with a laser. U.S. patent application Ser. No. 16/084,469 is incorporated herein, in its entirety, by this references. Any aspect or combination of parameters of the methods disclosed in U.S. patent application Ser. No. 16/084,469 (e.g., delays, speed, jumping, mirror parameters, lase patterns, etc.) may be used, alone or in combination with the methods and laser pulse parameters disclosed herein, to effectively ablate selected regions of the cemented carbide substrate 102 with high precision. Additional examples of methods of controllably shaping a material with a laser are disclosed in U.S. Pat. No. 9,999,962 issued on Jun. 19, 2018, the disclosure of which is incorporated herein, in its entirety, by this reference.

The laser 104 may be communicably coupled to a controller 113. The controller 113 may be configured to at least partially control the operation of the laser 104. For example, the controller 113 may direct the laser 104 to emit the laser pulses 112, select the parameters of the laser pulses 112 (e.g., power, etc.), and may move the laser 104 relative to the cemented carbide substrate 102 such that the laser pulses 112 ablate different regions of the cemented carbide substrate 102.

The controller 113 may include memory 115 and a processor 117. The memory 115 may store information thereon including computer executable instructions. The information may include at least one of information regarding the laser 104 (e.g., the type of laser), information received from one or more sensors (not shown), or one or more operational instructions. The operational instructions may include one or more of instructions to start/cease ablating the cemented carbide substrate 102, the selected shape of the cemented carbide substrate 102 (e.g., a 3D CAD file of the selected shape of the cemented carbide substrate 102), the characteristics of the laser pulses 112, or other suitable instructions. The processor 117 may receive the information stored in the memory 115 and may execute the operational instructions stored in the memory 115. Executing the operational instructions may cause the processor 117 to direct the laser 104 to operate according to the instructions stored on the operational instructions. For example, the processor 117 can receive the 3D CAD file and convert the 3D CAD file to code which, in turn, can be used to direct the laser 104 to shape the cemented carbide substrate 102.

The controller 113 may include a user interface that allows a user to interact with the controller 113 and, through the controller 113, the laser 104. For example, the controller 113 may include or be operably coupled to at least one of one or more output devices (e.g., display) or one or more input devices (e.g., a mouse, keyboard, etc.). The one or more output device may allow the user interface to display information to the user, such as the progress of the shaping the cemented carbide substrate 102, options that the user may select, etc. The input device may allow the user to interact with the user interface and may allow the user to input operational instructions into the controller 113.

In an embodiment, the method 100 may include using physical machining techniques (e.g., grinding, lapping, electrical discharge machining, etc.) to partially shape the cemented carbide substrate 102 (e.g., prior to laser ablation, subsequent to laser ablation, or combinations of the foregoing). In an embodiment, the method 100 may include using physical machining techniques to shape the cemented carbide substrate 102 into a rough approximation of the desired shape of the cemented carbide substrate 102. The cemented carbide substrate 102 may then be shaped using the laser pulses 112. Using machining techniques other than laser machining to shape the cemented carbide substrate 102 may be quicker and/or cheaper than shaping the cemented carbide substrate 102 solely by using the laser 104. However, using the laser 104 to ablate selected regions of the cemented carbide substrate 102 may remove any recast layer formed using electro-discharge machining techniques, remove microcracks located at or near the exposed surface of the cemented carbide substrate 102, and/or may cause the top surface 108 to exhibit a topography that is difficult or impossible to form using the physical machining techniques. In an embodiment, the method 100 may include using the machining techniques other than laser machining to shape the cemented carbide substrate 102 after laser ablating selected regions of the cemented carbide substrate 102.

In an embodiment, the method 100 may be repeated. For example, after or substantially simultaneously with selecting one or more first cemented carbide substrate 102, the method 100 may include selecting one or more additional cemented carbide substrates from the plurality of cemented carbide substrates 106. The method 100 may then include, after or substantially simultaneously with laser shaping the one or more first cemented carbide substrates 102, laser shaping the one or more additional cemented carbide substrates into a selected shape.

As previously discussed, the laser pulses 112 may ablate selected portions of the cemented carbide substrate 102 thereby changing the shape of the cemented carbide substrate 102. FIGS. 2A-2K are schematic cross-sectional views and top plan views of different shapes of a cemented carbide substrate that may be formed according to the methods disclosed herein, according to different embodiments. However, it is noted that the laser pulses 112 may form the cemented carbide substrate 102 into any selected shapes (e.g., shapes other than the shapes shown in FIGS. 2A-2K) without limitation.

Figure 2A:
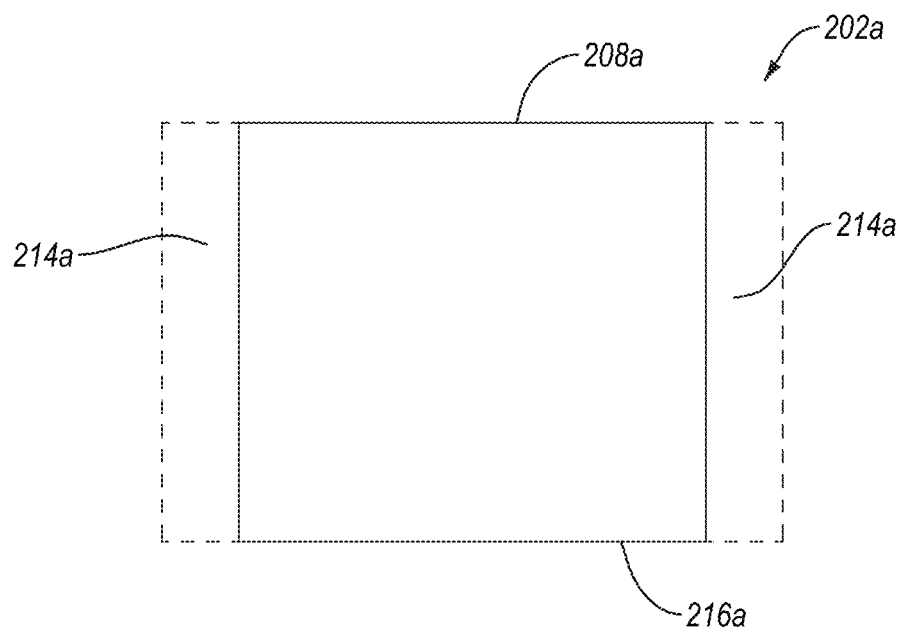
FIGS. 2A-2K are schematic cross-sectional views and top plan views of different shapes of a cemented carbide substrate that may be formed according to the methods disclosed herein, according to different embodiments.

Referring to FIG. 2A, which is a schematic cross-sectional view of a cemented carbide substrate 202a, the method 100 of FIG. 1 may be configured to change at least one of a size or shape of the cemented carbide substrate 202a. For example, the plurality of laser pulses 112 may be directed toward at least a portion of the top surface 208a and ablate selected regions 214a of the cemented carbide substrate 202a that extend from the top surface 208a to a bottom surface 216a of the cemented carbide substrate 202a, thereby changing the shape and/or size of the cemented carbide substrate 202a. In an embodiment, not shown, the selected regions 214a may be selected to both change the size and shape of the cemented carbide substrate 202a.

Figure 2B:
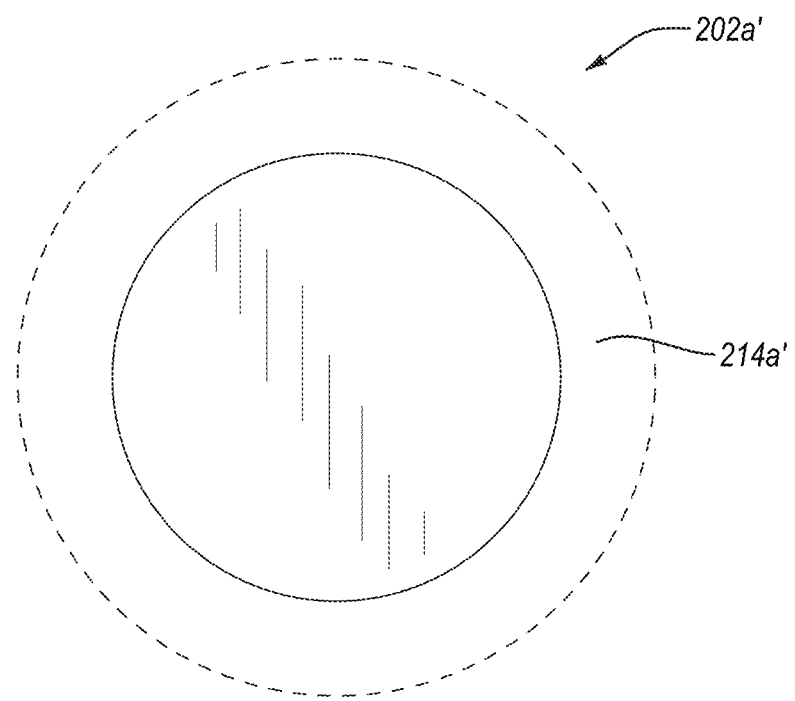
Figure 2C:
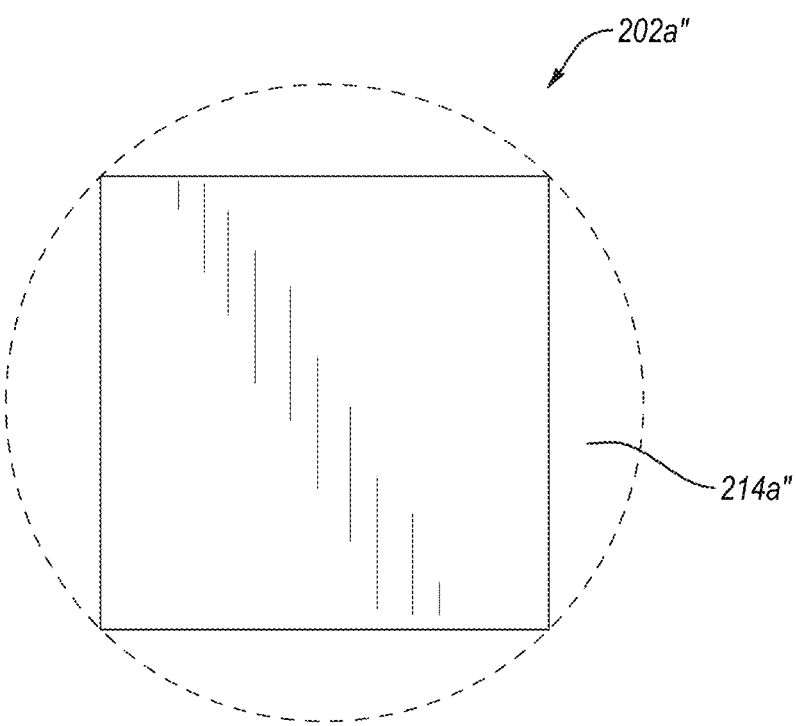

FIGS. 2B and 2C are a top plan view of two embodiments, respectively of shaped cemented carbide substrates 202a' and 202a", which may be formed by laser shaping the cemented carbide substrate 202a shown in FIG. 2A Referring to FIG. 2B, the selected region 214a' may be selected to only change the size of the cemented carbide substrate 202a'. For example, as illustrated, the selected regions 214a' are selected to decrease a lateral dimension (e.g., diameter) of the cemented carbide substrate 202a'. Referring to FIG. 2C, the selected regions 214a" may be selected to change the shape of the cemented carbide substrate 202a".

Figure 2D:
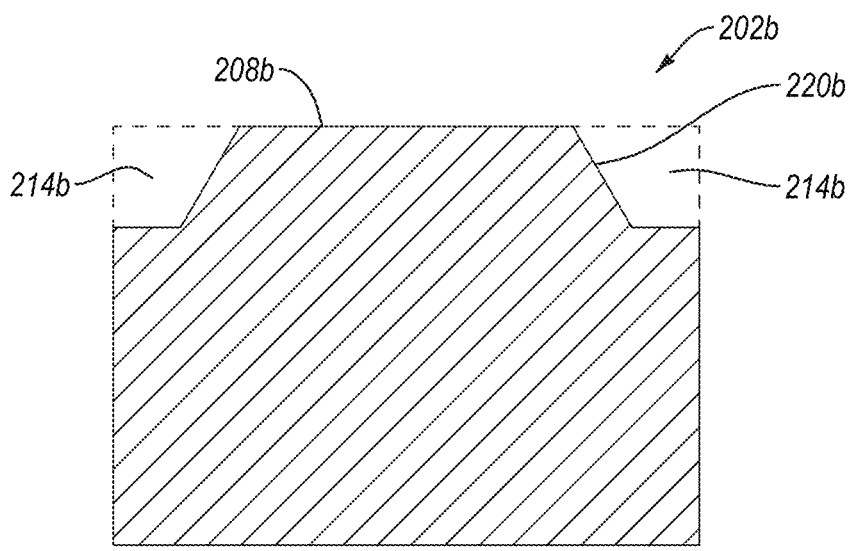
Figure 2E:
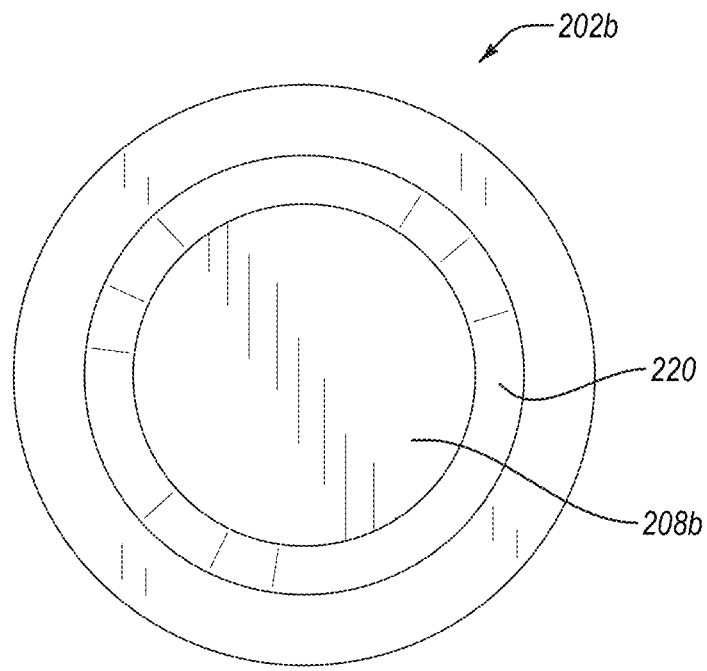

Referring to FIGS. 2D and 2E, which are schematic cross-sectional and top plan views of a shaped cemented carbide substrate 202b which may be formed by laser shaping the cemented carbide substrates 202a shown in FIG. 2A. For example, the method 100 of FIG. 1 may be configured to change the topography of the top surface 208a of the cemented carbide substrate 202a. Accordingly, as illustrated, top surface 208b of the cemented carbide substrate 202b may have initially included a larger, substantially planar topography. However, ablating selected regions 214b, as shown in FIG. 2D, may form a non-planar topography. In an embodiment, the non-planar topography may include a single protrusion 220b. The single protrusion 220b may inhibit detachment of a superhard table (not shown) bonded to the cemented carbide substrate 202b and may enable the superhard table to exhibit a greater thickness near a cutting edge thereof than if the top surface 208b exhibited a larger substantially planar topography.

Figure 2F:
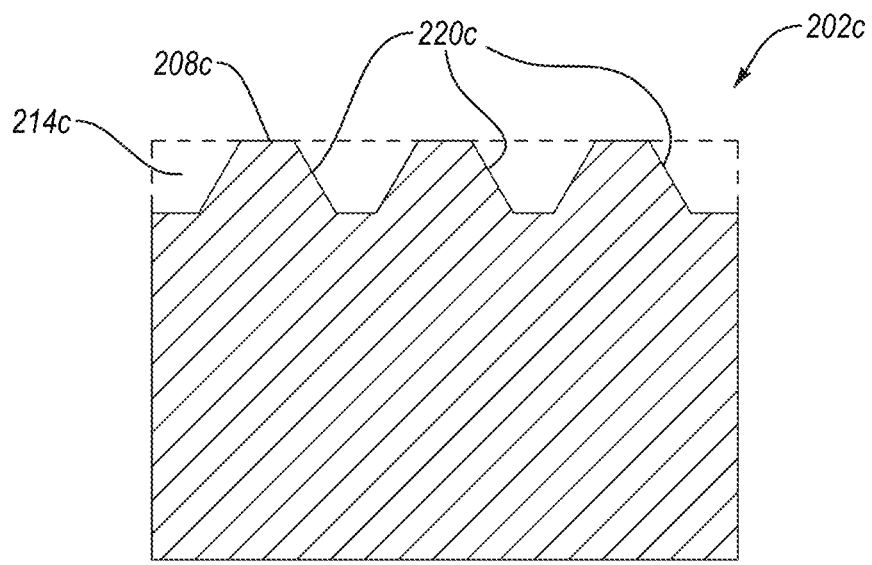
Figure 2G:
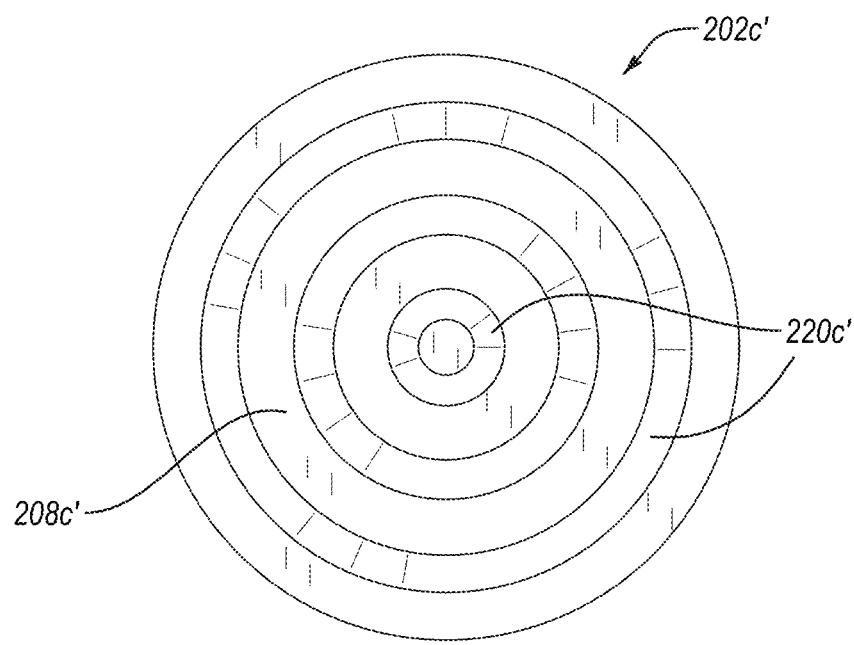
Figure 2H:
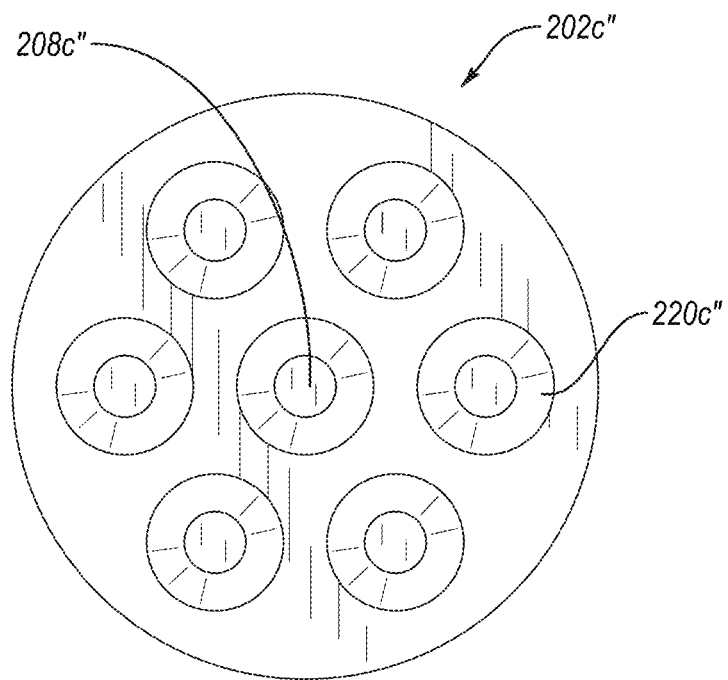

Referring to FIG. 2F, which is a schematic cross-sectional view of a cemented carbide substrate 202c, the method 100 of FIG. 1 may be configured to cause the top surface 208c to exhibit a non-planar topography exhibiting a plurality of protrusions 220c. The plurality of protrusions 220c may inhibit detachment of a superhard table (not shown) from the cemented carbide substrate 202c. FIGS. 2G and 2H are top plan views of the cemented carbide substrate 202c, according to different embodiments. Referring to FIG. 2G, the cemented carbide substrate 202c' includes a plurality of protrusions 220c', wherein each of the plurality of protrusions 220c' may exhibit an annular shape. Referring to FIG. 2H, the cemented carbide substrate 202c" includes a plurality of protrusions 220c", wherein each of the plurality of protrusions 220'c' may form truncated conical shapes that may be spaced from each other.

Figure 2I:
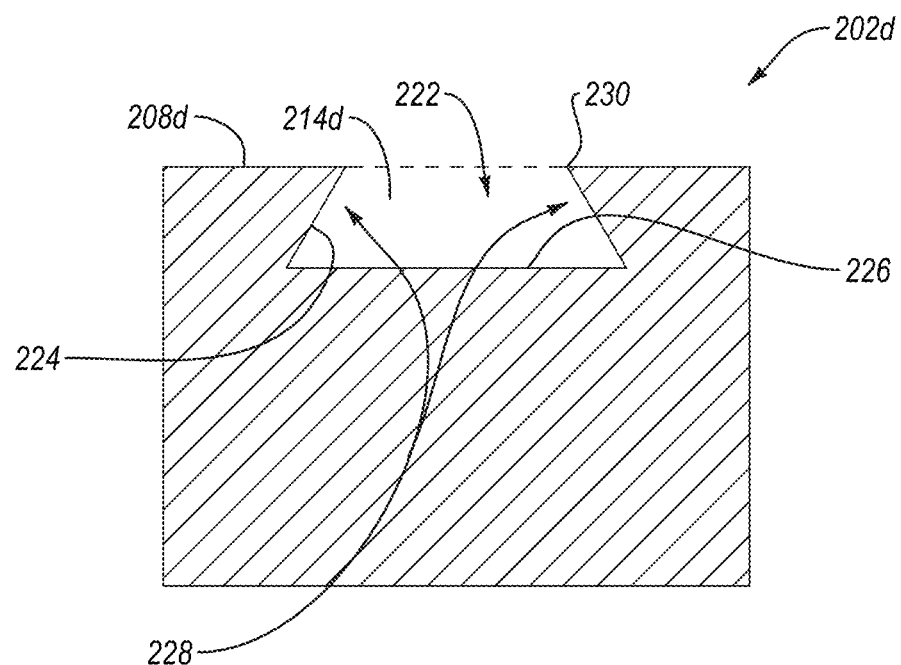

In an embodiment, the method 100 of FIG. 1 may be employed to form cemented carbide substrates into shapes that are difficult or impossible to form using conventional machining techniques. Referring to FIG. 2I, which is a cross-sectional schematic view of a cemented carbide substrate 202d, the method 100 of FIG. 1 may be configured to ablate selected regions 214d of the cemented carbide substrate 202d to form a recess 222. The recess 222 may extend from the top surface 208d of the cemented carbide substrate 202d. The recess 222 may inhibit detachment of a superhard table (not shown) from the cemented carbide substrate 202d.

The recess 222 may be defined by at least one recess lateral surface 224 and at least one recess bottom surface 226. In an embodiment, at least one of the recess lateral surface 224 or the recess bottom surface 226 is substantially planar. In such an embodiment, the at least one recess 222 may exhibit a generally trapezoidal cross-sectional shape. In an embodiment, at least one of the recess lateral surface 224 or the recess bottom surface 226 is curved, such as concavely curved. In such an embodiment, the recess 222 may exhibit a generally truncated circular cross-sectional shape.

In an embodiment, the recess 222 may include at least one undercut region 228. The undercut region 228 may limit detachment of a superhard table from the cemented carbide substrate 202d. The recess 222 includes at least one undercut region 228 when the recess 222 includes a maximum cross-sectional lateral dimension that is greater than a corresponding cross-sectional dimension of an opening 230 of the recess 222. For example, in the illustrated embodiment, the recess bottom surface 226 forms the maximum cross-sectional lateral dimension of the recess 222 and the maximum cross-sectional lateral dimension of the opening 230 is less than the maximum cross-sectional lateral dimension. In an example, the recess 222 may include at least one undercut region 228 when the angle between the recess lateral surface 224 and the recess bottom surface 226 is an acute angle. In such an example, the recess 222 may form a dovetail joint with a superhard table bonded thereto.

Figure 2J:
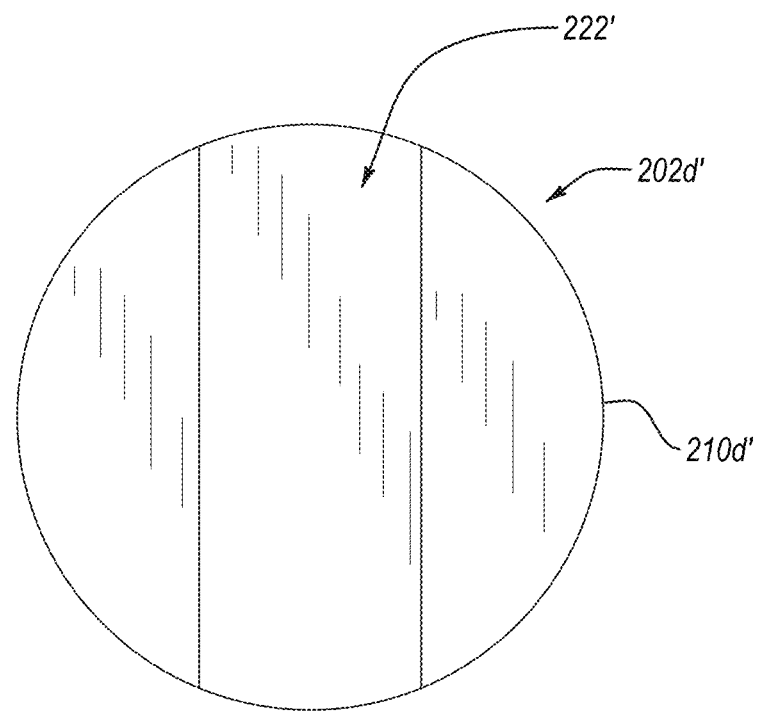
Figure 2K:
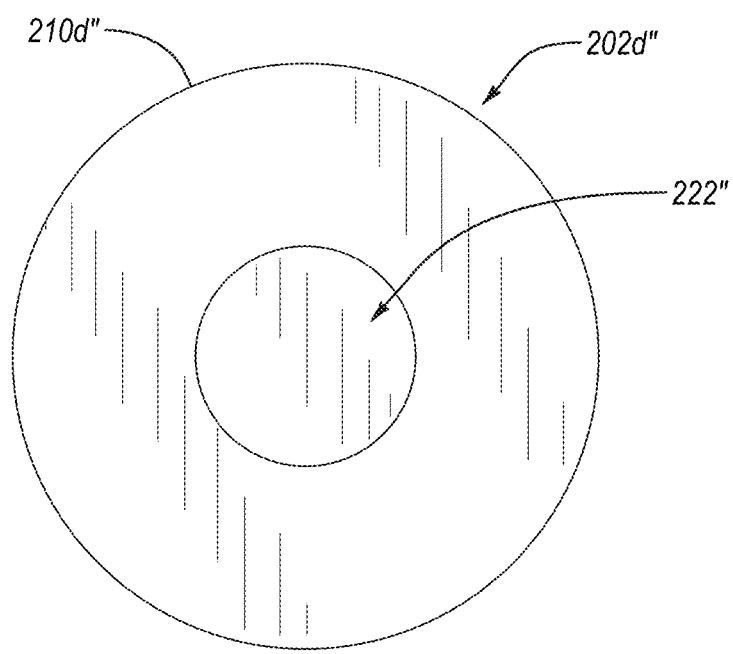

FIGS. 2J and 2K are top plan views of the cemented carbide substrate 202d, according to different embodiments. Referring to FIG. 2J, the recess 222' may extend between the lateral surface(s) 210d' of the cemented carbide substrate 202d'. The recess 222' may allow the cemented carbide substrate 202d' to be bonded to a superhard table by disposing a portion of a superhard powder or a preformed superhard table in the recess 222' and then sintering and/or bonding the superhard powder or preformed superhard table to the cemented carbide substrate 202d', for example, in an HPHT process. Referring to FIG. 2K, the recess 222" is spaced from the at least one lateral surface 210d".

In an embodiment, any of the cemented carbide substrates disclosed herein may have a superhard table bonded thereto to form a superhard compact. In an embodiment, the superhard compact may be formed by disposed a plurality of superhard particles adjacent to the top surface of the cemented carbide substrate and forming the superhard particles into a superhard table and bonding the superhard table to the cemented carbide substrate using any suitable method, such as an HPHT process. In an embodiment, the superhard compact may be formed by disposing a preformed superhard table adjacent to the top surface of the cemented carbide substrate and attaching the preformed superhard table to the cemented carbide substrate via brazing, press fitting, HPHT sintering or infiltrating, or any other suitable attachment method. In an example, the superhard table may be deposited on the top surface of the cemented carbide substrate using a chemical vapor deposition technique or a physical vapor deposition technique.

As used herein, the term "superhard" means a material having a hardness at least equal to the hardness of tungsten carbide. In an embodiment, the superhard table that is bonded to the cemented carbide substrate may include polycrystalline cubic boron nitride, polycrystalline diamond (e.g., formed by chemical vapor deposition or by HPHT sintering), diamond crystals, silicon carbide, silicon nitride, tantalum carbide, tungsten carbide (e.g., binderless tungsten carbide, cobalt-cemented tungsten carbide), boron carbide, other metal carbides, other superhard ceramic carbides, or combinations thereof. In an embodiment, the superhard table that is bonded to the cemented carbide substrate may include reaction-bonded silicon carbide or reaction-bonded silicon nitride. The reaction-bonded silicon carbide or reaction-bonded silicon nitride may have additional materials therein. For example, the additional materials in the reaction-bonded superhard ceramic may include diamond, polycrystalline diamond, cubic boron nitride, a material exhibiting a hardness greater than the reaction-bonded ceramic or a material exhibiting a thermal conductivity greater than the reaction-bonded ceramic. Adding materials to the reaction-bonded ceramic may increase the thermal conductivity and/or wear resistance of the superhard table. For example, diamond may be added to the reaction-bonded ceramic in an amount less that about 80 weight % (e.g., about 80 weight % to about 50 weight %, about 50 weight % to about 25 weight %, less than about 25 weight %). Suitable reaction-bonded ceramics are commercially available from M Cubed Technologies, Inc. of Newark, Delaware.

Figure 3:
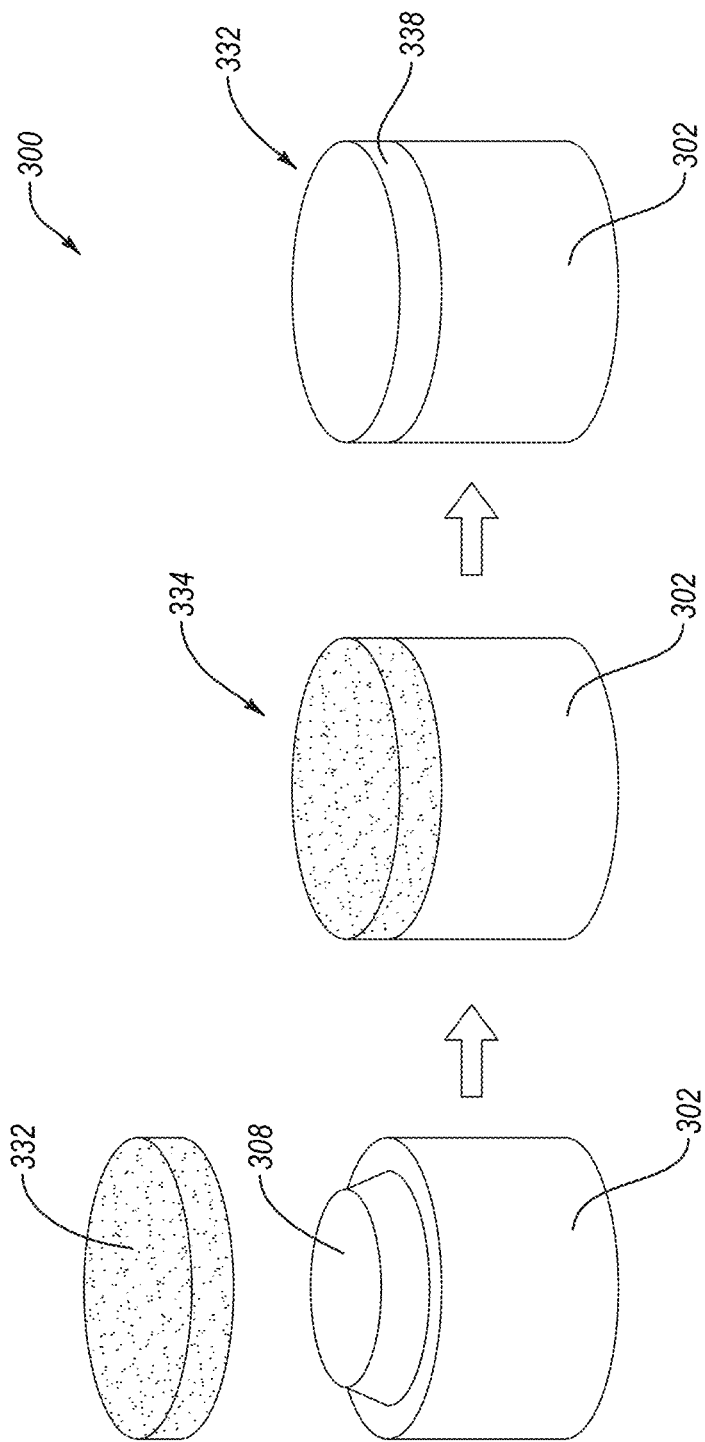
FIG. 3 is a schematic illustration of a method to form a polycrystalline diamond compact using any of the cemented carbide substrates disclosed herein, according to an embodiment.

FIG. 3 is a schematic illustration of a method 300 to form a polycrystalline diamond compact ("PDC") 332 using any of the shaped cemented carbide substrates disclosed herein (e.g., by the method 100), according to an embodiment. The method 300 may be performed after the method 100 of FIG. 1 is performed.

The method 300 includes disposing a mass of diamond particles 334 adjacent to a top surface 308 of a shaped cemented carbide substrate 302. The cemented carbide substrate 302 may include any of the cemented carbide substrates disclosed herein, without limitation. In some embodiments, the mass of diamond particles 334 may exhibit an average particle size of about 50 μm or less, such as about 30 μm or less, about 20 μm or less, about 10 μm to about 18 μm or, about 15 μm to about 18 μm. In an embodiment, the average particle size of the mass of diamond particles 334 may be about 10 μm or less, such as about 2 μm to about 5 μm or submicron.

In an embodiment, the diamond particles of the mass of diamond particles 334 may comprise a relatively larger size and at least one relatively smaller size. As used herein, the phrases "relatively larger" and "relatively smaller" refer to particle sizes (by any suitable method) that differ by at least a factor of two (e.g., 30 μm and 15 μm). In an embodiment, the mass of diamond particles 334 may include a portion exhibiting a relatively larger size (e.g., 30 μm, 20 μm, 15 μm, 12 μm, 10 μm, 8 μm) and another portion exhibiting at least one relatively smaller size (e.g., 6 μm, 5 μm, 4 μm, 3 μm, 2 μm, 1 μm, 0.5 μm, less than 0.5 μm, 0.1 μm, less than 0.1 μm). In one embodiment, the mass of diamond particles 334 may include a portion exhibiting a relatively larger size between about 10 μm and about 40 μm and another portion exhibiting a relatively smaller size between about 1 μm and 4 μm. In an embodiment, the mass of diamond particles 334 may comprise three or more different sizes (e.g., one relatively larger size and two or more relatively smaller sizes), without limitation.

It is noted that the as-sintered diamond grain size may differ from the average particle size of the mass of diamond particles 334 prior to sintering due to a variety of different physical processes, such as grain growth, diamond particles fracturing, carbon provided from another carbon source (e.g., dissolved carbon in the metal-solvent catalyst), or combinations of the foregoing. The metal-solvent catalyst (e.g., iron, nickel, cobalt, or alloys thereof) may be provided in particulate form mixed with the diamond particles, as a thin foil or plate placed adjacent to the mass of diamond particles 334, from the cemented carbide substrate 302 including a metal-solvent catalyst, or combinations of the foregoing.

More details about diamond particle sizes and diamond particle size distributions that may be employed are disclosed in U.S. Pat. No. 9,346,149 and U.S. patent application Ser. No. 14/627,966. Each of U.S. Pat. No. 9,346,149 and U.S. patent application Ser. No. 14/627,966 is incorporated herein, in its entirety, by this reference.

In order to sinter the mass of diamond particles 334, the mass of diamond particles 334 and the cemented carbide substrate 302 may be enclosed in a pressure transmitting medium (not shown for clarity), such as a refractory metal can, graphite structure, pyrophyllite, and/or other suitable pressure transmitting structure to form a cell assembly 336. Examples of suitable gasket materials and cell structures for use in manufacturing PCD are disclosed in U.S. Pat. Nos. 6,338,754 and 8,236,074, each of which is incorporated herein, in its entirety, by this reference. Another example of a suitable pressure transmitting material is pyrophyllite, which is commercially available from Wonderstone Ltd. of South Africa. The cell assembly 336 is subjected to a HPHT process using an ultra-high pressure press at a temperature of at least about 1000° Celsius (e.g., about 1100° Celsius to about 2200° Celsius, or about 1200° Celsius to about 1450° Celsius) and a pressure in the pressure transmitting medium of at least about 4.0 GPa (e.g., about 5.0 GPa to about 12.0 GPa, about 7.5 GPa to about 15 GPa, about 7.5 GPa to about 10 GPa, or about 8.0 GPa to about 10 GPa) for a time sufficient to sinter the diamond particles together in the presence of the metal-solvent catalyst and form a PCD table 338 comprising bonded diamond grains defining interstitial regions occupied by the metal-solvent catalyst. For example, the pressure in the pressure transmitting medium employed in the HPHT process may be at least at least about 5 GPa, at least about 6 GPa, at least about 7.5 GPa, at least about 8.0 GPa, at least about 9.0 GPa, at least about 10.0 GPa, at least about 11.0 GPa, at least about 12.0 GPa, or at least about 14 GPa.

The pressure values employed in the HPHT processes disclosed herein refer to the pressure in the pressure transmitting medium at room temperature (e.g., about 25° Celsius) with application of pressure using an ultra-high pressure press and not the pressure applied to exterior of the cell assembly 336. The actual pressure in the pressure transmitting medium at sintering temperature may be slightly higher. The ultra-high pressure press may be calibrated at room temperature by embedding at least one calibration material that changes structure at a known pressure such as, PbTe, thallium, barium, or bismuth in the pressure transmitting medium. Further, optionally, a change in resistance may be measured across the at least one calibration material due to a phase change thereof. For example, PbTe exhibits a phase change at room temperature at about 6.0 GPa and bismuth exhibits a phase change at room temperature at about 7.7 GPa. Examples of suitable pressure calibration techniques are disclosed in G. Rousse, S. Klotz, A. M. Saitta, J. Rodriguez-Carvajal, M. I. McMahon, B. Couzinet, and M. Mezouar, "Structure of the Intermediate Phase of PbTe at High Pressure," Physical Review B: Condensed Matter and Materials Physics, 71, 224116 (2005) and D. L. Decker, W. A. Bassett, L. Merrill, H. T. Hall, and J. D. Barnett, "High-Pressure Calibration: A Critical Review," J. Phys. Chem. Ref. Data, 1, 3 (1972).

During the HPHT process, a catalyst (e.g., cobalt, iron, nickel, alloys thereof, or combinations thereof) may infiltrate the mass of diamond particles 334 and facilitate diamond-to-diamond bonding between the diamond particles. In an embodiment, the catalyst may be provided from the cemented carbide substrate 302. In such an embodiment, the cemented carbide substrate 302 may include a metal-solvent catalyst (e.g., cobalt, nickel, iron, alloys thereof, or combinations thereof). During the HPHT process, the metal-solvent catalyst may liquefy and infiltrate the mass of diamond particles 334 to form the PCD table 338 and integrally bond (e.g., a metallurgical bond) the PCD table 338 to the cemented carbide substrate 302. However, it is noted that the catalyst may be provided from a source other than or in addition to the cemented carbide substrate 302 (e.g., from a metal film disposed between the cemented carbide substrate 302 and mass of diamond particles 334 or another suitable location) and/or the PCD table 338 may be bonded to the cemented carbide substrate 302 using another suitable method (e.g., brazing).

In an embodiment, the PCD table 338 may be leached to deplete a metal-solvent catalyst or a metallic infiltrant therefrom in order to enhance the thermal stability of the PCD table 338. For example, the PCD table 338 may be leached to remove at least a portion of the metal-solvent catalyst from a working region thereof to a selected depth that was used to initially sinter the diamond grains to form a leached thermally-stable region. The leached thermally-stable region may extend inwardly from a working surface of the PCD table 338 to a selected depth. In an embodiment, the depth of the thermally-stable region may be about 10 μm to about 1500 μm. More specifically, in an embodiment, the selected depth is about 50 μm to about 100 μm, about 200 μm to about 350 μm, about 350 μm to about 600 μm, about 400 μm to about 800 μm, or about 800 μm to about 1500 μm. The leaching may be performed in a suitable acid, such as aqua regia, nitric acid, hydrofluoric acid, or mixtures of the foregoing.

In an embodiment, after forming the PCD table 338, at least a portion of the PDC 332 (e.g., at least the cemented carbide substrate 302 or all surfaces of the PDC 332) may be machined to at least one of change a shape or dimension of the PDC (e.g., change an outside diameter of the PDC 332), remove manufacturing flaws from the PDC 332, shape the PCD table 338 (e.g., form a chamfer in the PCD table 338), or polish the PCD table 338. The PDC 332 may be machined using any suitable technique. For example, the PDC 332 may be machined by laser ablation techniques, centerless grinding, lapping, electro-discharge machining, or any other suitable machining technique. The PDC 332 may be machined either before and/or after leaching the PCD table 338.

One problem with conventional PDCs is that conventional PDCs are difficult to track. For example, an identifying marking (e.g., letters, numbers, and/or symbols) may be formed on the conventional PDC after the PDC is manufactured. However, machining the conventional PDC may result in the removal of the identifying marking. Further, PDCs are often used in applications (e.g., drilling or bearing applications, as discussed below) that result in wear on any exposed surface of the conventional PDC. The wear on the conventional PDC may result in the removal of the identifying marking.

Figure 4A:
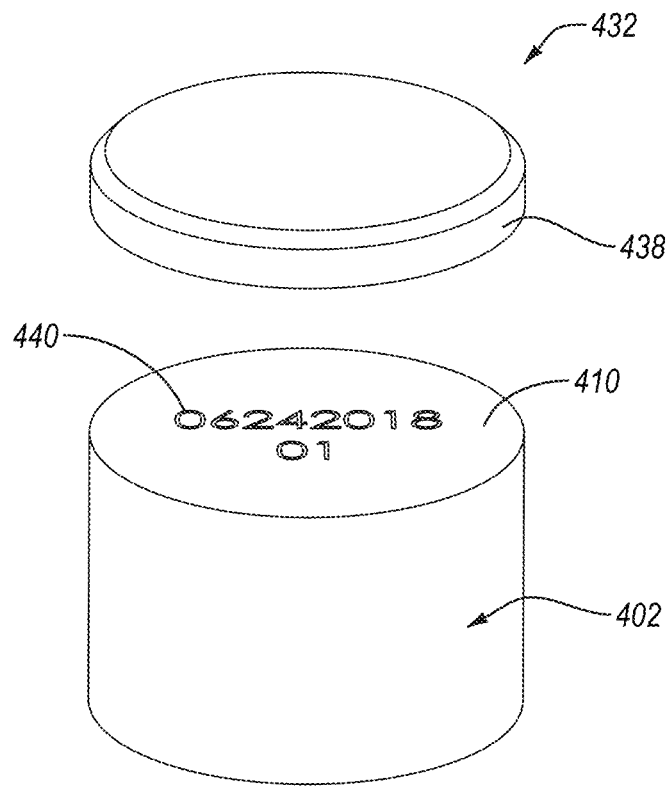
FIG. 4A is an exploded isometric view of a PDC that includes one or more identifying markings, according to an embodiment.

The methods disclosed herein may be used to form identifying markings on a PDC that are not removed during post-sintering machining processes and/or during use of the PDC. FIG. 4A is an exploded isometric view of a PDC 432 that includes one or more identifying markings 440, according to an embodiment. The PDC 432 includes a PCD table 438 bonded to a cemented carbide substrate 402. The PCD table 438 is illustrated as being separated from the cemented carbide substrate 402 so that a top surface 408 of the cemented carbide substrate 402 is shown. Except as otherwise disclosed herein, the cemented carbide substrate 402 is the same as or substantially similar to any of the cemented carbide substrates disclosed herein.

The cemented carbide substrate 402 includes one or more identifying markings 440 formed in the top surface 410 of the cemented carbide substrate 402. After forming the identifying markings 440 in the top surface 410, the PCD table 438 may be bonded to the cemented carbide substrate 402. The PCD table 438 may be bonded to the cemented carbide substrate 402 using any the processes disclosed herein. Bonding the PCD table 438 to the cemented carbide substrate 402 may cover and/or protect the identifying markings 440. As such, machining the PDC 432 and/or using the PDC 432 may not result in removal of the identifying markings 440 so long as the PCD table 438 protects the identifying markings 440. In an embodiment, the identifying markings 440 may be formed on the bottom surface of the cemented carbide substrate 402 since the bottom surface of the cemented carbide substrate 402 covered and/or protected by the support body during use.

The identifying markings 440 may be formed using any of the laser ablating techniques disclosed herein. However, in some embodiments, the identifying markings 440 may be formed using conventional machining techniques. For example, the identifying markings 440 may be formed using at least one of electro-chemical machining, electrical discharge machining, or grinding.

Figure 4B:
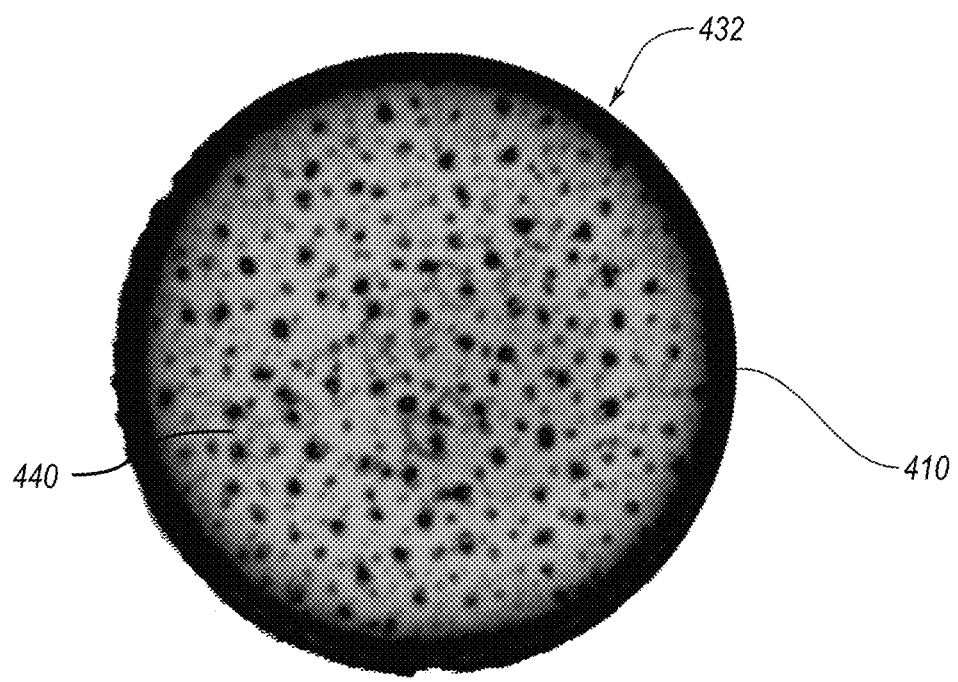
FIG. 4B is an acoustic microscopy image of the PDC shown in FIG. 4A.

The identifying markings 440 may be viewed using any suitable technique that may evaluate the interfacial surface of the PCD table 432 and/or substrate 402. For example, the identifying markings 440 may be detected using acoustic microscopy. FIG. 4B is an acoustic microscopy image of the PDC 432 shown in FIG. 4A. FIG. 4B illustrates that one or more identifying markers 440 of the PDC 432 may be detected after bonding a PCD table (not labeled) to a cemented carbide substrate 402. Other methods of detecting the identifying markers 440 includes computed tomography scans, removal of the cemented carbide substrate 402 (e.g., by acid leaching), or any other suitable technique. Examples of computed tomography scans that may be used to detect the identifying markings 440 are disclosed in U.S. Pat. No. 8,995,752 filed on Nov. 9, 2010, the disclosure of which is incorporated herein, in its entirety, by this reference.

Many of the embodiments discussed above include shaping (e.g., with a laser) at least the top surface of the cemented carbide substrate. However, it is noted that the methods disclosed herein (e.g., relating to lasing and/or physical machining methods) may also be used to shape other surfaces of the cemented carbide substrate. For example, the bottom surface of the cemented carbide substrate may be shaped to facilitate usage of the cemented carbide substrate in a support body (e.g., the bit body 602 of FIGS. 6A and 6B, the support body 704 of FIG. 7, or the inner race 802 or the outer race 804 of FIG. 8).

Figure 5A:
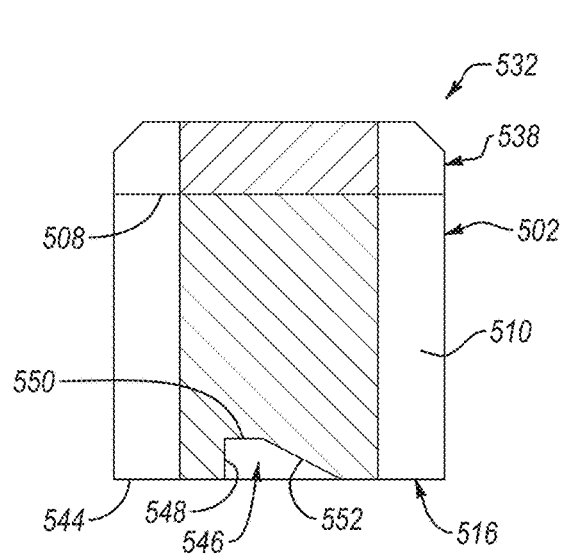
FIGS. 5A and 5B are a cross-sectional view and a bottom view, respectively of a PDC including a shaped cemented carbide substrate that is configured to facilitate correct positioning and/or rotation of the PDC in a support body, according to an embodiment.
Figure 5B:
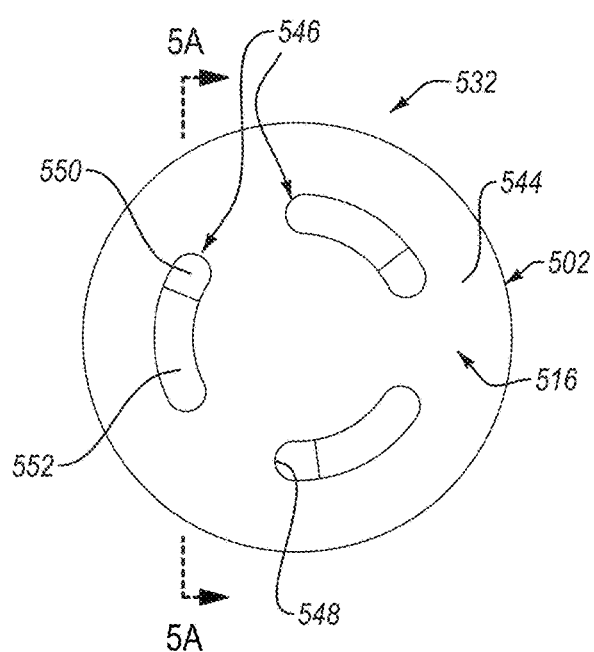
Figure 5C:
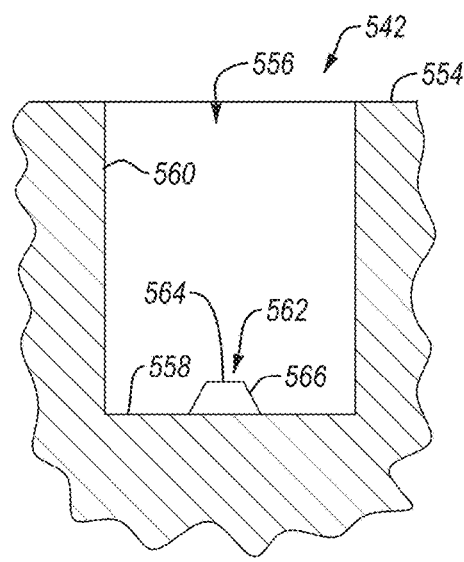
FIGS. 5C and 5D are a cross-sectional view and a top view, respectively, of a portion of a support body that is configured to receive at least a portion of the PDC shown in FIGS. 5A and 5B, according to an embodiment.
Figure 5D:
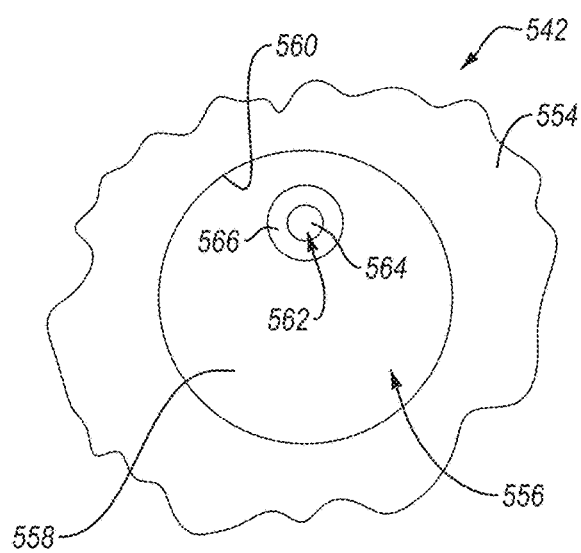

In an embodiment, the shaped bottom surface of the cemented carbide substrate may facilitate correct positioning and/or rotations of the cemented carbide substrate in the support body. FIGS. 5A and 5B are a cross-sectional view and a bottom view, respectively of a PDC 532 including a shaped cemented carbide substrate 502 that is configured to facilitate correct positioning and/or rotation of the PDC 532 in the support body 542, according to an embodiment. FIGS. 5C and 5D are a cross-sectional view and a top view, respectively, of a portion of a support body 542 that is configured to receive at least a portion of the PDC 532 shown in FIGS. 5A and 5B, according to an embodiment. Except as otherwise disclosed herein, the PDC 532 is the same or substantially similar to any of the PDCs disclosed herein. For example, the PDC 532 may include a PCD table 538 bonded to a top surface 508 (e.g., planar or non-planar top surface 508) of the cemented carbide substrate 502. Further, except as otherwise disclosed herein, the support body 542 may be the same or substantially similar to any of the support bodies disclosed herein.

Referring to FIGS. 5A and 5B, the cemented carbide substrate 502 includes a bottom surface 516 that is opposite the top surface 508. The bottom surface 516 is configured to interface with the support body 542. In the illustrated embodiment, the bottom surface 516 includes a generally planar portion 544 and a generally non-planar portion that defines at least one recess 546 extending from the planar portion 544 and into the cemented carbide substrate 502. For example, the non-planar portion of the bottom surface 516 may include at least one side surface 548 that extends from the planar portion 544 towards the top surface 508 of the cemented carbide substrate 502. The non-planar portion of the bottom surface 516 may also include a top surface 550 opposite the planar portion 544. Optionally, the non-planar portion of the bottom surface 516 may also include at least one tapered surface 552 that extends from the top surface 550 towards at least one of the planar portion 544 or the side surface 548. The recess 546 may be spaced from the lateral surface 510 of the cemented carbide substrate 502.

Referring to FIGS. 5C and 5D, the support structure 542 includes an upper surface 554 and defines at least one receptacle 556 extending from the upper surface 554. The receptacle 556 is configured to at least partially receive the PDC 538 therein. For example, the receptacle 556 may be defined by a lower surface 558 that is spaced from the upper surface 554 and at least one lateral surface 560 that extends from the upper surface 554 to the lower surface 558. The lateral surface 560 of the receptacle 556 may generally correspond to the lateral surface 510 of the cemented carbide substrate 502 and the lower surface 558 may generally correspond to the planar portion 544 of the cemented carbide substrate 502.

The receptacle 556 also includes at least one protrusion 562 extending from the lower surface 558. The protrusion 562 is configured to be at least partially positioned in the recess 546 defined by the cemented carbide substrate 502. In an embodiment, the protrusion 562 may exhibit a shape that generally corresponds to the shape of the recess 546. In an embodiment, as illustrated, the protrusion 562 may exhibit a shape that does not correspond to the shape of the recess 546 which may decrease the mass of the support body 542 and may facilitate rotation of the cemented carbide substrate 502 in the receptacle, as will be discussed in more detail below.

The protrusion 562 may define a topmost surface 564 that is spaced from the lower surface 558. The distance from the lower surface 558 to the topmost surface 564 of the protrusion 560 is selected to be equal to or less than the distance from the planar portion 544 of the cemented carbide substrate 502 to the top surface 550 of the recess 546. As such, lower surface 558 of the receptacle 556, and not the topmost surface 564 of the protrusion 652, limits how far the PDC 532 may be disposed in the receptacle. The topmost surface 564 may or may not correspond to the shape of the top surface 550. The protrusion 562 may also include at least one side surface 566 extending from the topmost surface 564 to the lower surface 558. The side surface 566 may be tapered (as shown) or vertical. The side surface 566 may or may not correspond to the shape of the side surface 548 and/or the tapered surface 552 of the cemented carbide substrate 502. In an embodiment, the receptacle 556 may only include a single protrusion 562 and/or the number of protrusions 562 formed in the receptacle 556 may be the same as the number of recesses 546 formed in the cemented carbide substrate 502 includes recesses 546.

The recess 546 of the cemented carbide substrate 502 and the protrusion 562 of the receptacle 556 are configured to facilitate rotation and/or orientation of the PDC 532 in the receptacle 556. For example, during use, the PCD table 538 may include a first portion that is exposed to significant wear and a second portion that is exposed to relatively minor wear. When the first portion of the PCD table 538 fails or is too significantly worn to be effective, a user of the PDC 532 may elect to rotate the PDC 532 in the receptacle 556 such that the second portion of the PCD table 538 is exposed to significant wear. Conventionally, correct rotation and alignment of the PDC 532 is left to skill and eye of an individual which may result in under-rotation of the PDC 532 such that the first portion is still exposed to significant wear or over-rotation of the PDC 532 which decreases the number of times the PDC 532 may be rotated.

As previously discussed, the recess 546 of the cemented carbide substrate 502 and the protrusion 562 of the receptacle 556 are configured to facilitate more accurate rotation of the PDC 532 in the receptacle 556. For example, the number of recesses 546 formed in the cemented carbide substrate 502 (e.g., three in the illustrated embodiment) may correspond to the number of rotations that the PDC 532 is expected to be rotated. Each of the recesses 546 may be equidistantly spaced. Thus, a selected orientation (e.g., of the PCD table and/or features thereof) of the PDC 532 in the recess 546 may be facilitated by rotating the PDC 532 until the protrusion 562 is disposed in the recess 546. The tapered surface(s) of the recess 546 (e.g., tapered surface 552) and/or the protrusion 562 (e.g., the side surface 566) may push the PDC 532 to a selected position such that the PDC 532 is not under-rotated. Any generally vertical surfaces of the recess 546 (e.g., side surface 548) and/or the protrusion 562 (e.g., the side surface 566, not shown) may provide a hard stop to prevent over-rotation of the PDC 532.

The bottom surface 516 (e.g., the planar portion 544 and the recess 546) of the cemented carbide substrate 502 may be formed using any of the methods disclosed herein. In an example, the bottom surface 516 may be formed using the method 100 illustrated in FIG. 1. In such an example, the bottom surface 516 may be formed by selecting a cemented carbide substrate that may include a substantially planar bottom surface from a plurality of cemented carbide substrates and lasing the substantially planar bottom surface to form the at least one recess 546. In an example, the bottom surface 516 may be formed using a physical machining process, such as grinding, lapping, EDM, etc. In an example, the bottom surface 516 may be formed by providing a sacrificial material and forming the cemented carbide substrate 502 around the sacrificial material. The sacrificial material may be selected to be more easily removed from the cemented carbide substrate 502 (e.g., using acid etching, lasing, or physical machining techniques) than the non-sacrificial material portions of the cemented carbide substrate 502.

The protrusion 562 of the receptacle 556 may be formed using any of the methods disclosed herein. In an example, the protrusion 562 may be formed by removing portions of the support body 542 using the method 100 illustrated in FIG. 1. In an example, the protrusion 562 may be formed by removing portions of the support body 542 using a physical machining process, such as grinding, lapping, EDM, etc. In an example, the protrusion 562 may be formed by attaching (e.g., brazing or press-fitting) the protrusion 562 to the support body 542. In an example, the protrusion 562 is formed simultaneously with forming the receptacle 556.

It is noted that the non-planar bottom surface 518 of the cemented carbide substrate 502 illustrated in FIGS. 5A and 5B is merely one embodiment of a non-planar bottom surface. In an embodiment, the non-planar bottom surface of the cemented carbide substrate may include one or more protrusions and the support body may include one or more recesses that are configured to receive the protrusions of the cemented carbide substrate. In an embodiment, the non-planar bottom surface of the cemented carbide substrate may be substantially similar to the non-planar surfaces shown in FIGS. 2C to 2K. In such an embodiment, the receptacle of the support body may include a corresponding surface.

Referring back to FIGS. 5A and 5B, the PCD table 538 includes a upper surface 570 that is opposite the surface of the PCD table 538 that is attached to the top surface 508 of the cemented carbide substrate 502. In an embodiment, as illustrated, the upper surface 570 of the PCD table 538 is substantially planar. In an embodiment, not shown, the upper surface 570 of the PCD table 538 is non-planar. In such an embodiment, the upper surface 570 may include one or more surface features. The surface features may include at least one of one or more recesses extending into the PCD table 538, one or more ridges formed between adjacent ridges, one or more protrusions extending from the rest of the PCD table 538, one or more divots, one or more textured surfaces, or any other surface feature. Examples of surface features are illustrated in U.S. Design patent application Ser. No. 29/626,328 filed on Nov. 16, 2017, the disclosure of which is incorporated herein, in its entirety, by this reference. The surface features may be formed using any of the techniques disclosed herein, such as using the lasing techniques disclosed in U.S. Pat. No. 9,999,962 and U.S. patent application Ser. No. 16/084,469, the disclosure of each of which were previously incorporated herein. The surface features may be formed in the PCD table 538 before, after, or substantially concurrently with forming the non-planar bottom surface 518 of the cemented carbide substrate 502.

The surface features of the PCD table 538 may be configured to have a specific orientation relative to the support body 542. For example, when the support body 542 is a drill bit body (e.g., bit body 602 of FIGS. 6A and 6B), one or more of the surface features may be configured to form a cutting surface of the PCD table 538 or may be configured to not form a cutting surface of the PCD table 538. In an embodiment, as discussed above, the PCD table 538 may include a first portion and a second portion and each of the first and second portion may include similar surface features thereby allowing the PDC 532 to be rotated. Conventional PDCs and conventional support bodies may have relied on the eye of the individual securing the conventional PDCs to the conventional support bodies to ensure that the surface features are correctly oriented. However, the non-planar bottom surface 518 of the cemented carbide substrate 502 and the corresponding non-planarity of the receptacle 556 (e.g., the protrusion 562) may be configured to facilitate the correct orientation and/or rotation of the PDC 532 in the receptacle 556. For example, the recess 546 of the cemented carbide substrate 502 may have a specific orientation relative to the surface features of the PCD table

538 such that the surface features of the PCD table 538 is correctly oriented when the recess 546 receives the protrusion 562.

The disclosed PCD and PDC embodiments may be used in a number of different applications including, but not limited to, use in a rotary drill bit (FIGS. 6A and 6B), a thrust-bearing apparatus (FIG. 7), a radial bearing apparatus (FIG. 8), a subterranean drilling system (FIG. 9), and a wire-drawing die. The various applications discussed above are merely some examples of applications in which the PCD and PDC embodiments may be used. Other applications are contemplated, such as employing the disclosed PCD and PDC embodiments in friction stir welding tools.

In an embodiment, a preformed PCD table may have one or more identifying markings formed on an interfacial surface thereof. The pre-formed PCD table may then be attached to a cemented carbide substrate (e.g., any of the cemented carbide substrates disclosed herein) using any of the processes disclosed herein. The identifying markings formed on the interfacial surface of the pre-formed PCD table may be viewable after attaching the pre-formed PCD table to the cemented carbide substrate.

Figure 6A:
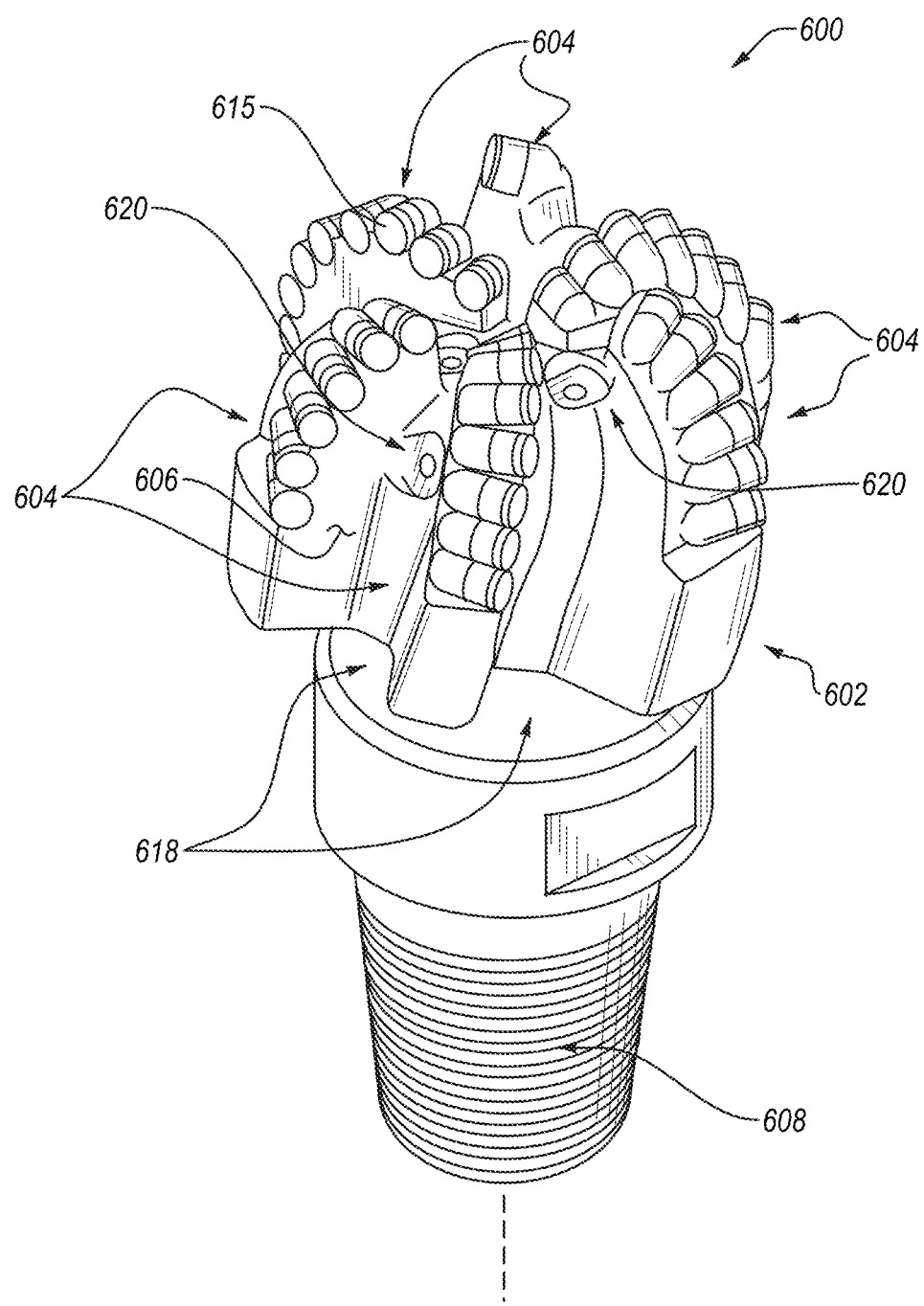
FIG. 6A is an isometric view of a rotary drill bit, according to an embodiment.
Figure 6B:
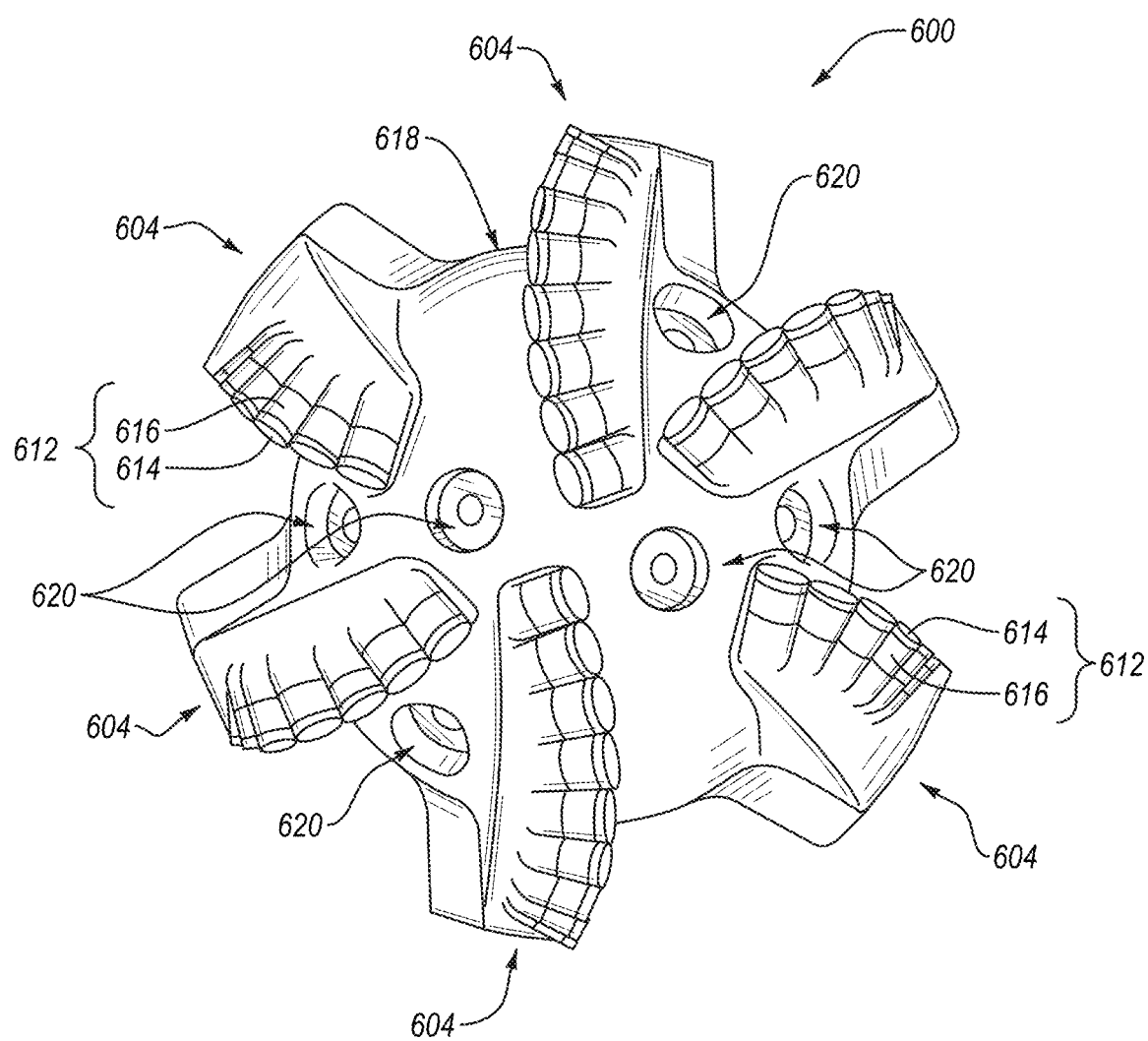
FIG. 6B is a top elevation view of the rotary drill bit shown in FIG. 6A.

FIG. 6A is an isometric view and FIG. 6B is a top elevation view of an embodiment of a rotary drill bit 600, according to an embodiment. The rotary drill bit 600 includes at least one PDC with a shaped substrate configured according to any of the previously described embodiments. The rotary drill bit 600 comprises a bit body 602 that includes radially and longitudinally extending blades 604 with leading faces 606, and a threaded pin connection 608 for connecting the bit body 602 to a drilling string. The bit body 602 defines a leading end structure for drilling into a subterranean formation by rotation about a longitudinal axis 610 and application of weight-on-bit. At least one PDC cutting element, configured according to any of the previously described PDC embodiments (e.g., the PDC 300 shown in FIG. 3A), may be affixed to the bit body 602. With reference to FIG. 6B, a plurality of PDCs 612 are secured to the blades 604. For example, each PDC 612 may include a PCD table 614 bonded to a substrate 616. More generally, the PDCs 612 may comprise any PDC disclosed herein, without limitation. In addition, if desired, in some embodiments, a number of the PDCs 612 may be conventional in construction. Also, circumferentially adjacent blades 604 define so-called junk slots 618 therebetween, as known in the art. Additionally, the rotary drill bit 600 may include a plurality of nozzle cavities 620 for communicating drilling fluid from the interior of the rotary drill bit 600 to the PDCs 612.

FIGS. 6A and 6B merely depict an embodiment of a rotary drill bit that employs at least one cutting element comprising a PDC fabricated and structured in accordance with the disclosed embodiments, without limitation. The rotary drill bit 600 is used to represent any number of earth-boring tools or drilling tools, including, for example, core bits, roller-cone bits, fixed-cutter bits, eccentric bits, bicenter bits, reamers, reamer wings, or any other downhole tool including PDCs, without limitation.

Figure 7:
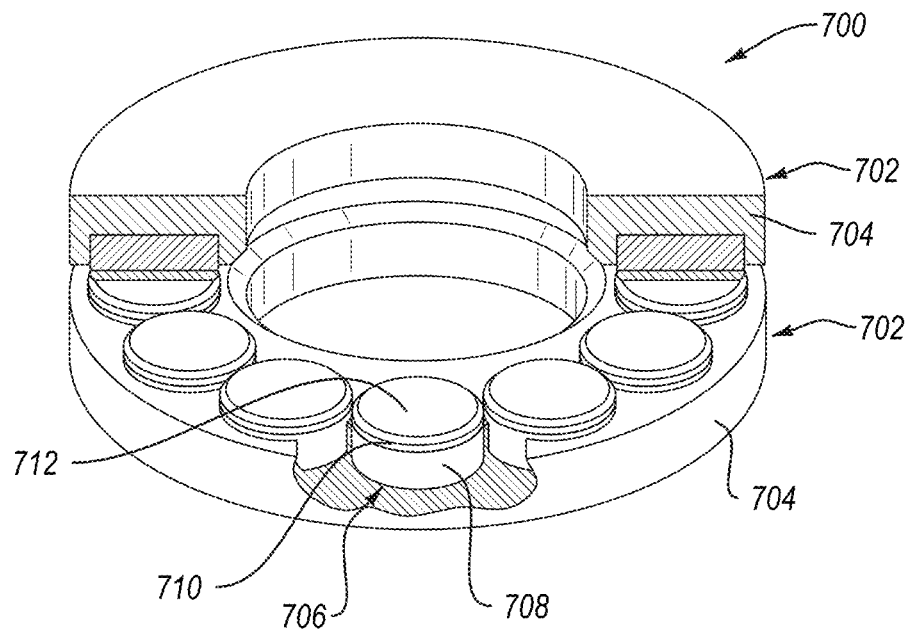
FIG. 7 is an isometric cut-away view of an embodiment of a thrust-bearing apparatus, which may utilize any of the disclosed PDC embodiments as bearing elements, according to an embodiment.

FIG. 7 is an isometric cut-away view of an embodiment of a thrust-bearing apparatus 700, which may utilize any of the disclosed embodiments (e.g., included in a PCD bearing element), according to an embodiment. The thrust-bearing apparatus 700 includes respective thrust-bearing assemblies 702. Each thrust-bearing assembly 702 includes an annular support ring 704 that may be fabricated from a material, such as carbon steel, stainless steel, or another suitable material. Each support ring 704 includes a plurality of recesses (not labeled) that receives a corresponding bearing element 706. Each bearing element 706 may be mounted to a corresponding support ring 704 within a corresponding recess by brazing, press-fitting, using fasteners, or another suitable mounting technique. One or more, or all of bearing elements 706 may be configured according to any of the disclosed embodiments. For example, each bearing element 706 may include a shaped substrate 708 and a PCD table 710, with the PCD table 710 including a bearing surface 712.

In use, the bearing surfaces 712 of one of the thrust-bearing assemblies 702 bears against the opposing bearing surfaces 712 of the other one of the bearing assemblies 702. For example, one of the thrust-bearing assemblies 702 may be operably coupled to a shaft to rotate therewith and may be termed a "rotor." The other one of the thrust-bearing assemblies 702 may be held stationary and may be termed a "stator."

Figure 8:
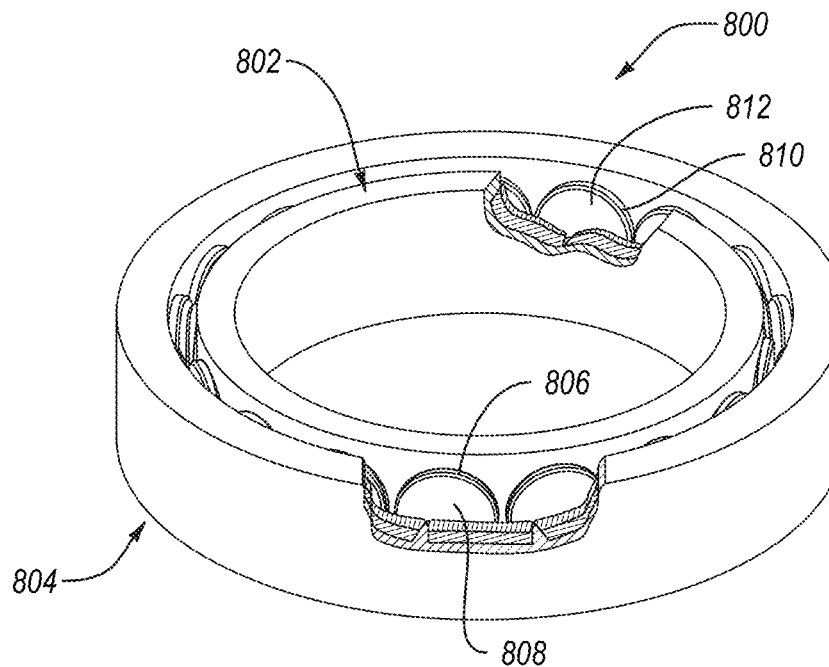
FIG. 8 is an isometric cut-away view of an embodiment of a radial bearing apparatus, which may utilize any of the disclosed PDC embodiments as bearing elements, according to an embodiment.

FIG. 8 is an isometric cut-away view of an embodiment of a radial bearing apparatus 800, which may utilize any of the disclosed embodiments, according to an embodiment. The radial bearing apparatus 800 includes an inner race 802 positioned generally within an outer race 804. The outer race 804 includes a plurality of bearing elements 806 affixed thereto that have respective bearing surfaces 808. The inner race 802 also includes a plurality of bearing elements 810 affixed thereto that have respective bearing surfaces 812. One or more, or all of the bearing elements 806 and 810 may be configured according to any of the PDC embodiments disclosed herein. The inner race 802 is positioned generally within the outer race 804 and, thus, the inner race 802 and outer race 804 may be configured so that the bearing surfaces 808 and 812 may at least partially contact one another and move relative to each other as the inner race 802 and outer race 804 rotate relative to each other during use.

The radial-bearing apparatus 800 may be employed in a variety of mechanical applications. For example, so-called "roller cone" rotary drill bits may benefit from a radial-bearing apparatus disclosed herein. More specifically, the inner race 802 may be mounted to a spindle of a roller cone and the outer race 804 may be mounted to an inner bore formed within a cone and that such an outer race 804 and inner race 802 may be assembled to form a radial-bearing apparatus.

Figure 9:
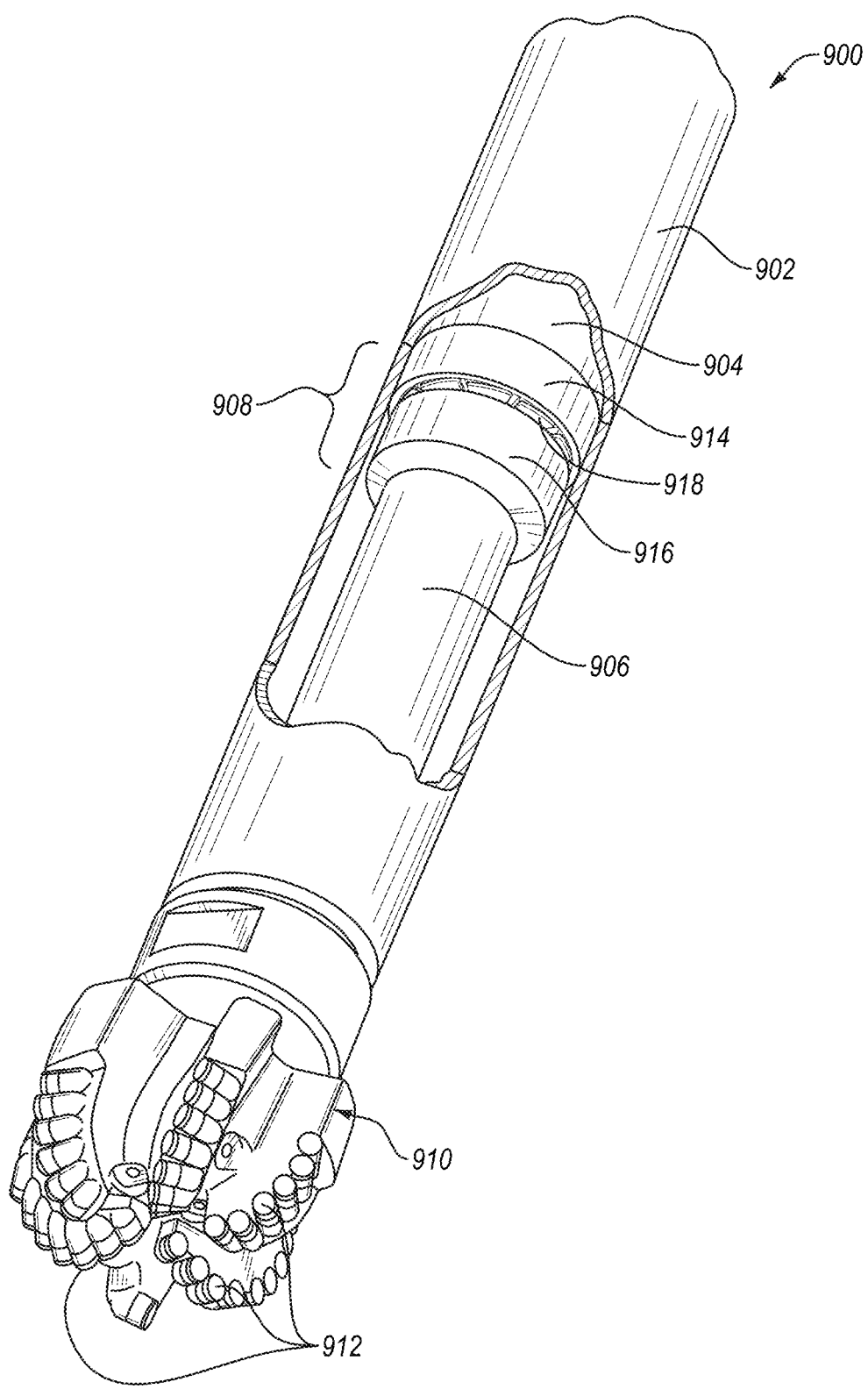
FIG. 9 is a schematic isometric cutaway view of an embodiment of a subterranean drilling system that uses a thrust-bearing apparatus, according to an embodiment.

Any of the embodiments for bearing apparatuses and/or cutting elements (e.g., superhard compacts) discussed above may be used in a subterranean drilling system. FIG. 9 is a schematic isometric cutaway view of an embodiment of a subterranean drilling system 900 that uses a thrust-bearing apparatus, according to an embodiment. The subterranean drilling system 900 includes a housing 902 enclosing a downhole drilling motor 904 (i.e., a motor, turbine, or any other device capable of rotating an output shaft) that is operably connected to an output shaft 906. A thrust-bearing apparatus 908 is operably coupled to the downhole drilling motor 904. The thrust-bearing apparatus 908 may be configured as any of the previously described thrust-bearing apparatus embodiments. A rotary drill bit 910 configured to engage a subterranean formation and drill a borehole is connected to the output shaft 906. The rotary drill bit 910 is shown as so-called "fixed cutter" drill bit including a plurality of blades having a plurality of PDC cutting elements 912 mounted thereon. However, in other embodiments, the rotary drill bit 910 may be configured as a roller cone bit including a plurality of roller cones.

The thrust-bearing apparatus 908 includes a stator 914 that does not rotate and a rotor 916 that is attached to the output shaft 906 and rotates with the output shaft 906. The stator 914 may include a plurality of circumferentially spaced tilting pads 918 or other suitable bearing elements (not shown). The stator 914 may include any of the features illustrated, described, or disclosed herein.

In operation, drilling fluid may be circulated through the downhole drilling motor 904 to generate torque and effect rotation of the output shaft 906 and the rotary drill bit 910 attached thereto so that a borehole may be drilled. A portion of the drilling fluid is also used to lubricate opposing bearing surfaces of the stator 914 and rotor 916. As the borehole is drilled, pipe sections may be connected to the subterranean drilling system 900 to form a drill string capable of progressively drilling the borehole to a greater depth within the earth.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

We claim:

1. A method, comprising:
   laser ablating selected regions of a cemented carbide substrate, thereby forming the cemented carbide substrate into a selected shape;
   after laser ablating selected regions of the cemented carbide substrate:
      enclosing a plurality of diamond particles and the cemented carbide substrate in a pressure transmitting medium to form a cell assembly; and
      subjecting the cell assembly to a temperature of at least about 1000° C. and a pressure in the pressure transmitting medium of at least about 4 GPa to infiltrate the plurality of diamond particles with a portion of a metal-solvent catalyst of the cemented carbide substrate and catalyze formation of a polycrystalline diamond table that is bonded to the cemented carbide substrate.

2. The method of claim 1 wherein forming the cemented carbide substrate into a selected shape includes forming a non-planar surface.

3. The method of claim 1 wherein forming the cemented carbide substrate into a selected shape includes forming at least one recess that includes at least one undercut region.

4. The method of claim 1 further comprising, before emitting the plurality of laser pulses, uploading instructions into a controller that is operably coupled to the laser, the instructions including the selected shape of the cemented carbide substrate.

5. The method of claim 1 wherein the cemented carbide substrate includes a cobalt-cemented tungsten carbide substrate.

6. The method of claim 1 wherein forming the cemented carbide substrate into a selected shape includes forming at least one recess that includes at least one undercut region.

7. The method of claim 1 wherein forming the cemented carbide substrate into a selected shape includes reducing a lateral dimension of the cemented carbide substrate.

8. The method of claim 1 wherein emitting a plurality of laser pulses includes emitting the plurality of laser pulses at an average power of about 1 watt to about 500 watts.

9. The method of claim 1 wherein emitting a plurality of laser pulses includes emitting the plurality of laser pulses at a frequency of about 20 kHz to about 2 MHz.

10. The method of claim 1, further comprising leaching at least a portion of the metal-solvent catalyst from the polycrystalline diamond table.

11. The method of claim 1, wherein the polycrystalline diamond table includes an upper surface opposite a surface of the polycrystalline diamond table that is adjacent to the top surface of the cemented carbide substrate; and
   further comprising, after subjecting the cell assembly to a temperature of at least about 1000° C. and a pressure in the pressure transmitting medium of at least about 4 GPa, shaping the upper surface of the polycrystalline diamond table to include one or more surface features.

12. The method of claim 1, further comprising selecting the cemented carbide substrate from a plurality of cemented carbide substrates before laser ablating selected regions of the cemented carbide substrate.

13. The method of claim 2 wherein the cemented carbide substrate exhibits a substantially planar surface before laser ablating selected regions of the cemented carbide substrate.

14. The method of claim 5 wherein the substantially planar surface includes a substantially planar top surface and the non-planar surface includes a non-planar top surface.

15. The method of claim 5, wherein the substantially planar surface includes a substantially planar bottom surface and the non-planar surface includes a non-planar bottom surface.

16. The method of claim 2, wherein the non-planar surface includes a single protrusion.

17. The method of claim 2, wherein the non-planar surface includes a plurality of protrusions.

18. The method of claim 2, wherein the non-planar surface includes one or more recesses formed therein.

19. The method of claim 10 wherein the one or more recesses are configured to form a portion of a dovetail joint.

20. The method of claim 2, wherein the non-planar surface includes one or more identifying indicia formed therein.

21. The method of claim 2, wherein the non-planar surface of the cemented carbide substrate is the top surface of the cemented carbide substrate.

* * * * *